US009658961B2

(12) United States Patent
Gschwind et al.

(10) Patent No.: US 9,658,961 B2
(45) Date of Patent: May 23, 2017

(54) SPECULATION CONTROL FOR IMPROVING TRANSACTION SUCCESS RATE, AND INSTRUCTION THEREFOR

(71) Applicant: International Business Machines Corporation, Armonk, NY (US)

(72) Inventors: Michael Karl Gschwind, Chappaqua, NY (US); Valentina Salapura, Chappaqua, NY (US); Eric M. Schwarz, Gardiner, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/317,463

(22) Filed: Jun. 27, 2014

(65) Prior Publication Data

US 2015/0378912 A1    Dec. 31, 2015

(51) Int. Cl.
*G06F 9/30*     (2006.01)
*G06F 12/084*   (2016.01)
*G06F 12/0842*  (2016.01)

(52) U.S. Cl.
CPC ........ *G06F 12/084* (2013.01); *G06F 12/0842* (2013.01); *G06F 2212/1016* (2013.01); *G06F 2212/1041* (2013.01); *G06F 2212/281* (2013.01); *G06F 2212/452* (2013.01); *G06F 2212/507* (2013.01); *G06F 2212/62* (2013.01)

(58) Field of Classification Search
CPC .................................................. G06F 12/0842
See application file for complete search history.

(56) References Cited

U.S. PATENT DOCUMENTS

| | | | |
|---|---|---|---|
| 5,396,604 A | * | 3/1995 | DeLano .................. G06F 9/383 711/118 |
| 5,586,297 A | | 12/1996 | Bryg et al. |
| 5,664,148 A | | 9/1997 | Mulla et al. |
| 5,802,572 A | | 9/1998 | Patel et al. |
| 5,845,327 A | | 12/1998 | Rickard et al. |
| 6,321,302 B1 | | 11/2001 | Strongin et al. |

(Continued)

FOREIGN PATENT DOCUMENTS

WO     2013016186 A2    1/2013

OTHER PUBLICATIONS

IBM, "List of IBM Patents or Patent Applications Treated as Related (Appendix P)," Sep. 11, 2015, pp. 1-2.

(Continued)

*Primary Examiner* — William B Partridge
(74) *Attorney, Agent, or Firm* — Reza Sarbakhsh

(57) ABSTRACT

Throttling instruction execution in a transaction operating in a processor configured to execute memory instructions out-of-order in a pipelined processor, wherein memory instructions are instructions for accessing operands in memory is provided. Included is executing, by the processor, instructions of a transaction comprising determining whether the transaction is in throttling mode and based on the transaction being in throttling mode, executing memory instructions in-program-order. Also included is based on the transaction not-being in throttling mode, executing memory instructions out-of-program order.

14 Claims, 20 Drawing Sheets

(56) References Cited

U.S. PATENT DOCUMENTS

| | | | |
|---|---|---|---|
| 6,349,361 | B1 | 2/2002 | Altman et al. |
| 6,871,273 | B1* | 3/2005 | Moore ................ G06F 9/30043 |
| | | | 712/207 |
| 7,269,694 | B2 | 9/2007 | Tremblay et al. |
| 7,389,383 | B2 | 6/2008 | Tremblay et al. |
| 7,395,382 | B1 | 7/2008 | Moir |
| 7,398,355 | B1* | 7/2008 | Moir ..................... G06F 9/3004 |
| | | | 711/118 |
| 7,496,716 | B2 | 2/2009 | Dice et al. |
| 7,676,636 | B2 | 3/2010 | Cypher et al. |
| 7,810,085 | B2 | 10/2010 | Shinnar et al. |
| 7,890,725 | B2 | 2/2011 | von Praun et al. |
| 7,917,698 | B2 | 3/2011 | Cypher et al. |
| 8,074,030 | B1 | 12/2011 | Moir et al. |
| 8,195,898 | B2 | 6/2012 | Welc et al. |
| 8,209,499 | B2 | 6/2012 | Chou |
| 8,301,849 | B2 | 10/2012 | Rajwar et al. |
| 8,352,712 | B2 | 1/2013 | Bell, Jr. et al. |
| 8,364,909 | B2 | 1/2013 | Chakrabarti |
| 2002/0087794 | A1* | 7/2002 | Jouppi ................ G06F 9/30116 |
| | | | 711/126 |
| 2004/0044850 | A1 | 3/2004 | George et al. |
| 2007/0245099 | A1 | 10/2007 | Gray et al. |
| 2007/0273699 | A1* | 11/2007 | Sasaki ................... G06F 9/3879 |
| | | | 345/502 |
| 2008/0005737 | A1 | 1/2008 | Saha et al. |
| 2008/0250226 | A1* | 10/2008 | Eickemeyer ........ G06F 9/30145 |
| | | | 712/20 |
| 2008/0270745 | A1 | 10/2008 | Saha et al. |
| 2009/0006767 | A1 | 1/2009 | Saha et al. |
| 2009/0172305 | A1 | 7/2009 | Shpeisman et al. |
| 2009/0172317 | A1 | 7/2009 | Saha et al. |
| 2010/0058344 | A1 | 3/2010 | Ni et al. |
| 2010/0169623 | A1 | 7/2010 | Dice |
| 2011/0145512 | A1 | 6/2011 | Adl-Tabatabai et al. |
| 2011/0145553 | A1 | 6/2011 | Levanoni et al. |
| 2011/0246725 | A1 | 10/2011 | Moir et al. |
| 2012/0079204 | A1 | 3/2012 | Chachad et al. |
| 2012/0144126 | A1 | 6/2012 | Nimmala et al. |
| 2012/0159461 | A1 | 6/2012 | Nakaike |
| 2012/0174083 | A1 | 7/2012 | Shpeisman et al. |
| 2012/0233411 | A1 | 9/2012 | Pohlack et al. |
| 2012/0297152 | A1 | 11/2012 | Saha et al. |
| 2012/0311246 | A1 | 12/2012 | McWilliams et al. |
| 2012/0324447 | A1 | 12/2012 | Huetter et al. |
| 2014/0281402 | A1* | 9/2014 | Comparan .......... G06F 9/30189 |
| | | | 712/214 |
| 2015/0378793 | A1 | 12/2015 | Gschwind |
| 2015/0378897 | A1 | 12/2015 | Gschwind et al. |
| 2015/0378915 | A1 | 12/2015 | Gschwind |

OTHER PUBLICATIONS

Gschwind et al., "Speculation Control for Improving Transaction Success Rate, and Instruction Therefor," filed Sep. 2, 2015, 84 Pages, U.S. Appl. No. 14/842,879.

Gschwind, "Improving Memory Performance When Speculation Control is Enabled, and Instruction Therefor," filed Jun. 27, 2014, 102 Pages, U.S. Appl. No. 14/317,417.

Gschwind, "Improving Memory Performance When Speculation Control is Enabled, and Instruction Therefor," filed Sep. 2, 2015, 100 Pages, U.S. Appl. No. 14/842,949.

U.S. Appl. No. 14/317,394, filed Jun. 27, 2014, entitled "Detecting Cache Conflicts by Utilizing Logical Address Comparisons in a Transactional Memory".

U.S. Appl. No. 14/317,371, filed Jun. 27, 2014, entitled: "Accurate Tracking of Transactional Read and Write Sets With Speculation".

U.S. Appl. No. 14/317,417, filed Jun. 27, 2014, entitled: "Improving Memory Performance When Speculation Control is Enabled, and Instruction Therefor".

U.S. Appl. No. 14/317,370, filed Jun. 27, 2014, entitled: "Managing Read Tags in a Transactional Memory".

U.S. Appl. No. 14/317,391, filed Jun. 27, 2014, entitled: "Conditional Inclusion of Data in a Transactional Memory Read Set".

U.S. Appl. No. 14/317,422, filed Jun. 27, 2014, entitled: "Co-Processor Memory Accesses in a Transactional Memory".

U.S. Appl. No. 14/317,444, filed Jun. 27, 2014, entitled: "Co-Processor Memory Accesses in a Transactional Memory".

U.S. Appl. No. 14/317,376, filed Jun. 27, 2014, entitled: "Transactional Execution in a Multi-Processor Environment That Monitors Memory Conflicts in a Shared Cache".

U.S. Appl. No. 14/317,415, filed Jun. 27, 2014, entitled: "Transactional Execution Processor Having a Co-Processor Accelerator, Both Sharing a Higher Level Cache".

U.S. Appl. No. 14/317,446, filed Jun. 27, 2014, entitled: "Allocating Read Blocks to a Thread in a Transaction Using User Specified Logical Addresses".

U.S. Appl. No. 14/317,382, filed Jun. 27, 2014, entitled: "Allowing Non-Cacheable Loads Within a Transaction".

Proceedings 2012 IEEE/ACM 45th International Symposium on Microarchitecture MICRO-45, presented Dec. 1-5, 2012, "Transactional Memory Architecture and Implementation for IBM System z", pp. 25-36.

McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Shriraman et al., "Implementation tradeoffs in the design of flexible transactional memory support*", *This work was supported in part by NSF grants CCF-0702505, CCR-0204344, CNS-0411127, CNS-0615139, CNS-0834451, and CNS-0509270; NIH grants 5 R21 GM079259-02 and 1 R21 HG004648-01; an IBM Faculty Partnership Award; equipment support from Sun Microsystems Laboratories; and financial support from Intel and Microsoft, Journal of Parallel and Distributed Computing, vol. 70, Issue 10, Oct. 2010, pp. 1068-1084, © 2010.

Del Barrio, "Optimizing Signatures in Hardware Transactional Memory Systems", Doctoral Thesis for Doctor of Philosophy, Department of Computer Science, University of Malaga, Oct. 2012 (Best Date Available), pp. 1-192.

Moravan et al., "Supporting Nested Transactional Memory in LogTM"; Appears in the proceedings of the Twelfth International Conference on Architectural Support for Programming Languages and Operating Systems, University of Wisconsin, ASPLOS, Oct. 25, 2006, pp. 1-41.

Berke et al., "A Cache Technique for Synchronization Variables in Highly Parallel, Shared Memory Systems", Original Publication Date: Dec. 31, 1988, An IP.com Prior Art Database Technical Disclosure, IP.com No. IPCOM000128199D, IP.com Electronic Publication: Sep. 15, 2005, pp. 1-17.

Jacobi et al., "Transactional Memory Architecture and Implementation for IBM System z" Proceedings 2012 IEEE/ACM 45th International Symposium on Microarchitecture MICRO-45, presented Dec. 1-5, 2012, Published: Dec. 2012 (Best Date Available), pp. 25-36.

IBM, "z/Architecture, Principles of Operation", Tenth Edition, Sep. 2012 (Best Date Available), Reference No. SA22-7832-09, Total pp. 1-1568.

"Intel® Architecture Instruction Set Extensions Programming Reference", Reference No. 319433-012A, Feb. 2012 (Best Date Available), pp. 1-604.

Zyulkyarov et al., Transaction Processing Core for Accelerating Software Transactional Memory, Barcelona Supercomputing Center, Barcelona Spain, Microsoft Research Cambridge UK, Departament d'Arquitectura de Computadors Technical Report UPCDACRRGEN20075, Aug. 2007 (Best Date Available), <https://www.ac.upc.edu/app/research-reports/html/2007/44/>, pp. 1-24.

Mak et al., "IBM System z10 Processor Cache Subsystem Microarchitecture", IBM J. Res. & Dev. vol. 53, No. 1, Paper 2, Published Date: Jan. 2009 (Best Date Available), pp. 1-12.

IBM, "DB Write Accelerator", An IP.com Prior Art Database Technical Disclosure, Original Publication Date: Oct. 24, 2007, IP.com No. IPCOM000159668D, IP.com Electronic Publication: Oct. 24, 2007, pp. 1-4.

(56) References Cited

OTHER PUBLICATIONS

Marandola et al., "Enhancing Cache Coherent Architectures with Access Patterns for Embedded Manycore Systems", AN-13172273, International Symposium on System on Chip (Soc), Oct. 10-12, 2012, Tampere, Published by IEEE, Oct. 2012 (Best Date Available), pp. 1-7.

Morad et al., "Generalized MultiAmdahl: Optimization of Heterogeneous Multi-Accelerator SoC", CCIT Report #812, Sep. 2012 (Best Date Available), pp. 1-1.

Suh et al., "Soft Error Benchmarking of L2 Caches with PARMA", SIGMETRICS '11, Jun. 7-11, 2011, San Jose, California, USA, Copyright 2011 (Best Date Available), ACM, pp. 1-12.

Disclosed Anonymously, "File Service Definition Language", An IP.com Prior Art Database Technical Disclosure, IP.com No. IPCOM000212123D, IP.com Electronic Publication: Oct. 31, 2011, pp. 1-7.

Minh et al., "An Effective Hybrid Transactional Memory System with Strong Isolation Guarantees", ISCA '07, Jun. 9-13, 2007, San Diego, California, Copyright 2007 (Best Date Available), ACM, pp. 1-12.

Saha et al, "Architectural Support for Software Transactional Memory", Proceedings of the 39th Annual IEEE/ACM International Symposium on Microarchitecture (MICRO '06), Dec. 9-13, 2006, Orlando, Florida, Copyright 2006 IEEE (Best Date Available), pp. 1-12.

Casper et al. "Hardware Acceleration of Transactional Memory on Commodity Systems", ASPOLS '11, Mar. 5-11, 2011, Newport Beach, California, Conference Paper available: Mar. 2011, Copyright 2011 (Best Date Available), ACM, pp. 1-12.

Blake et al., "Bloom Filter Guided Transaction Scheduling", 2011 IEEE 17th International Symposium on High Performance Computer Architecture, Feb. 12-16, 2011, San Antonio, TX, Conference Paper available: Jan. 2011 (Best Date Available), Publisher: IEEE, 2011, pp. 1-12.

Monash, "Memory-Centric Data Management", Monash Information Services, Version 1.01, May 2006 (Best Date Available), © Monash Information Services, 2006, pp. 1-38.

\* cited by examiner

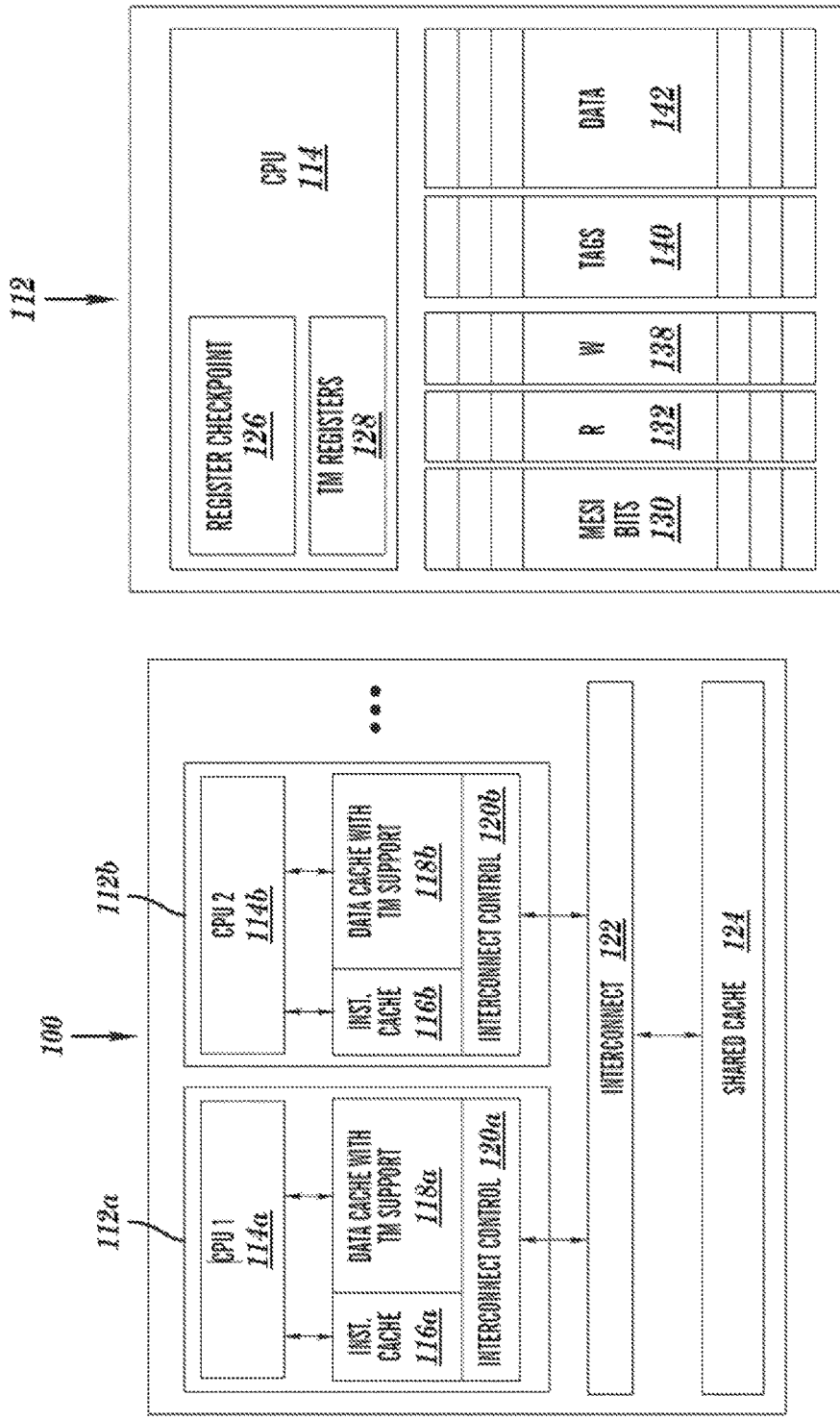

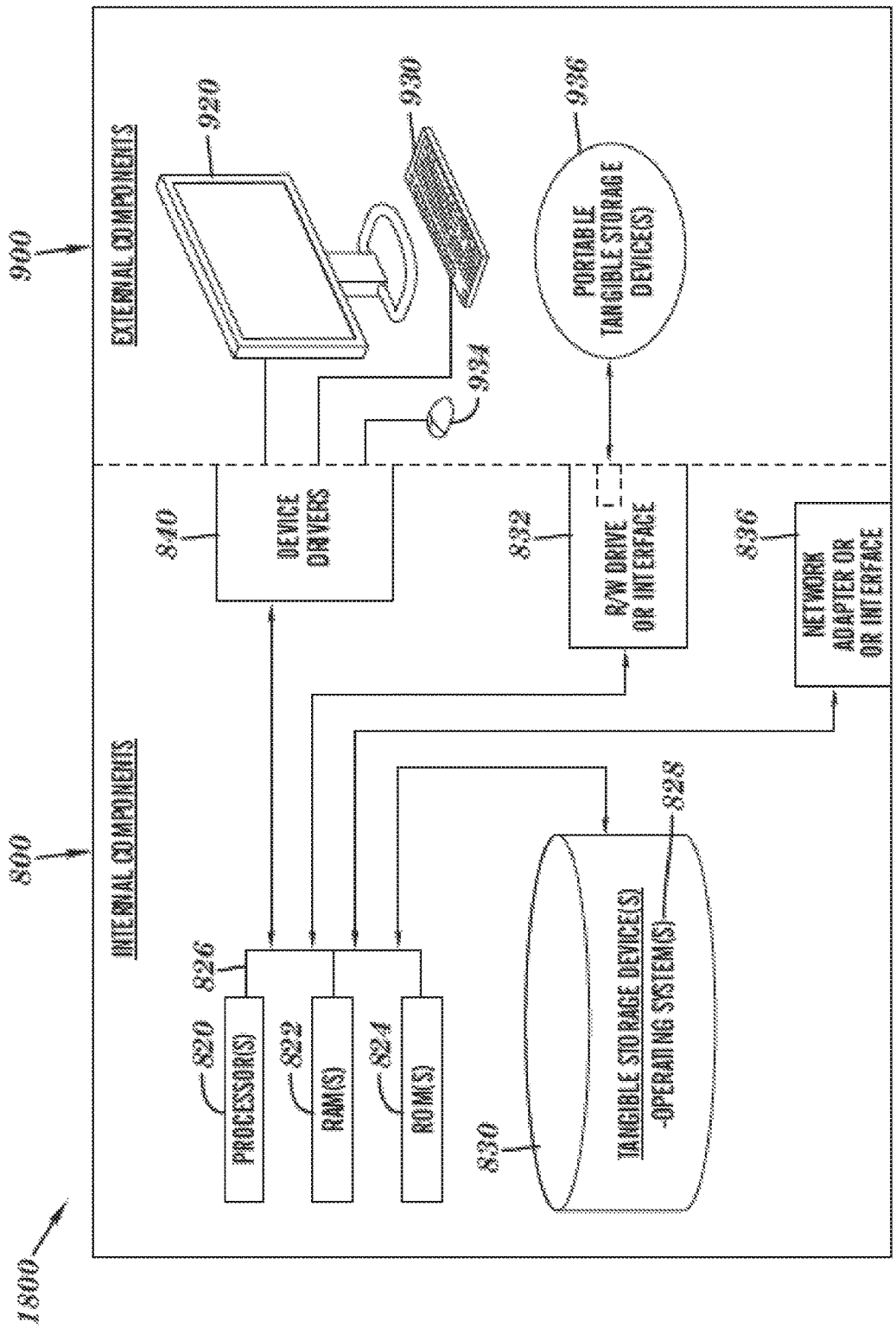

SPECULATION CONTROL FOR IMPROVING TRANSACTION SUCCESS RATE, AND INSTRUCTION THEREFOR

BACKGROUND

The present embodiment relates generally to transactional execution, and more specifically to improving transaction success rate when speculation control is enabled.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with anther operation on the same memory location. Previously, software transactional memory implementations have been proposed to support software Transactional Memory (TM). However, hardware TM can provide improved performance aspects and ease of use over software TM.

U.S. Patent Application Publication No 2012/01599461 titled "Program Optimizing Apparatus, Program Optimizing Method, And Program Optimizing Article Of Manufacture" filed 2012 Jun. 21 and incorporated by reference herein teaches An apparatus having a transactional memory enabling exclusive control to execute a transaction. The apparatus includes: a first code generating unit configured to interpret a program, and generate first code in which a begin instruction to begin a transaction and an end instruction to commit the transaction are inserted before and after an instruction sequence including multiple instructions to execute designated processing in the program; a second code generating unit configured to generate second code at a predetermined timing by using the multiple instructions according to the designated processing; and a code write unit configured to overwrite the instruction sequence of the first code with the second code or to write the second code to a part of the first code in the transaction.

U.S. Patent 2011/0246725 titled "System and Method for Committing Results of a Software Transaction Using a Hardware Transaction" filed 2011 Oct. 6 and incorporated by reference herein teaches The system and methods described herein may exploit hardware transactional memory to improve the performance of a software or hybrid transactional memory implementation, even when an entire user transaction cannot be executed within a hardware transaction. The user code of an atomic transaction may be executed within a software transaction, which may collect read and write sets and/or other information about the atomic transaction. A single hardware transaction may be used to commit the atomic transaction by validating the transaction's read set and applying the effects of the user code to memory, reducing the overhead associated with commitment of software transactions. Because the hardware transaction code is carefully controlled, it may be less likely to fail to commit Various remedial actions may be taken before retrying hardware transactions following some failures. If a transaction exceeds the constraints of the hardware, it may be committed by the software transactional memory alone.

SUMMARY

Throttling instruction execution in a transaction operating in a processor configured to execute memory instructions out-of-order in a pipelined processor, wherein memory instructions are instructions for accessing operands in memory is provided. Included is executing, by the processor, instructions of a transaction comprising determining whether the transaction is in throttling mode and based on the transaction being in throttling mode, executing memory instructions in-program-order. Also included is based on the transaction not-being in throttling mode, executing memory instructions out-of-program order.

BRIEF DESCRIPTION OF THE SEVERAL VIEWS OF THE DRAWINGS

These and other objects, features and advantages of the present embodiment will become apparent from the following detailed description of illustrative embodiments thereof, which is to be read in connection with the accompanying drawings. The various features of the drawings are not to scale as the illustrations are for clarity in facilitating one skilled in the art in understanding the embodiment in conjunction with the detailed description. In the drawings:

FIGS. 1 and 2 depict an example multicore Transactional Memory environment, in accordance with the present embodiment;

FIG. 21 depicts a block diagram of internal and external components of computers and servers, in accordance with the present embodiment.

DETAILED DESCRIPTION

Figure 3:
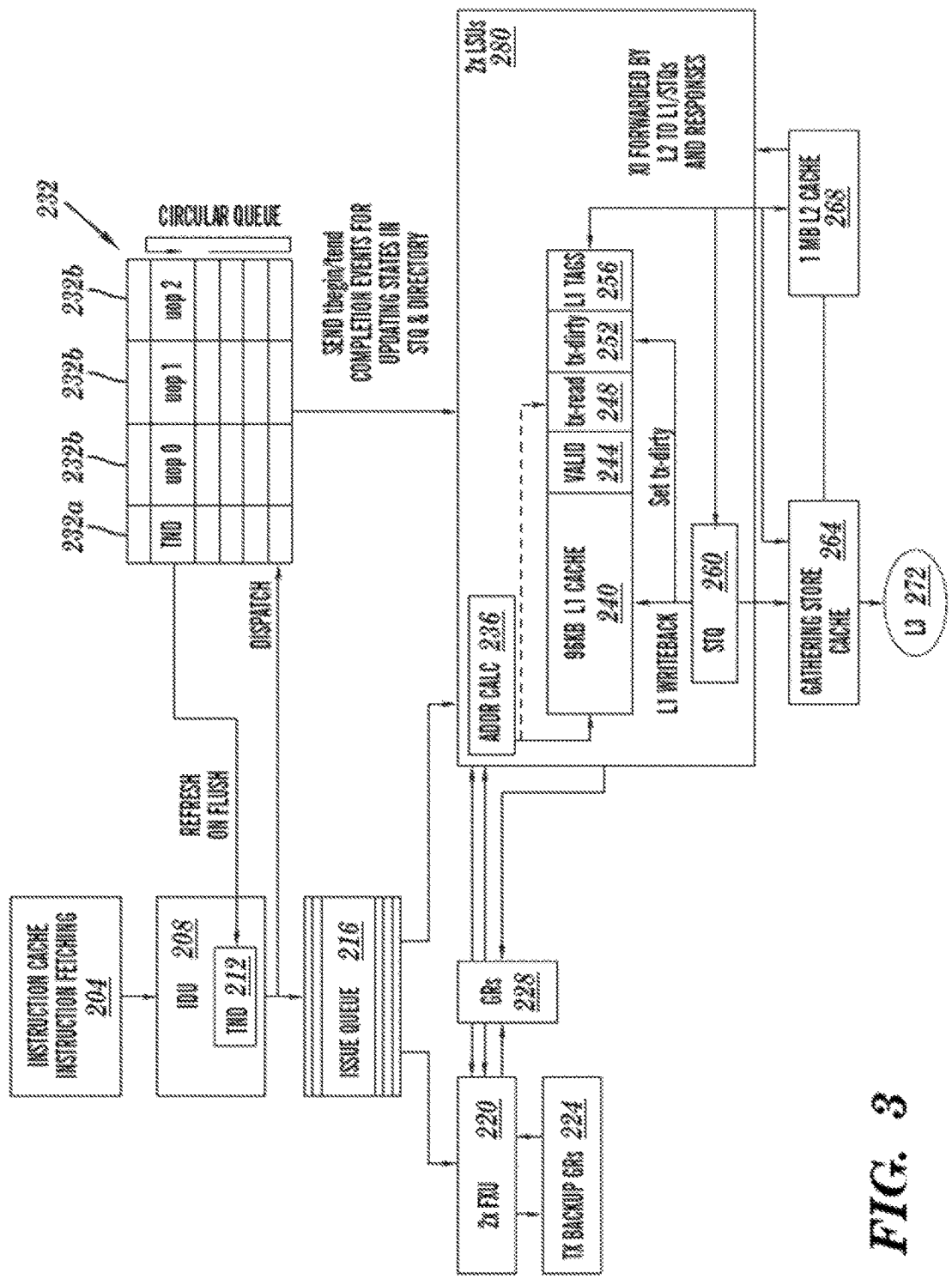
FIG. 3 depicts example components of an example CPU, in accordance with the present embodiment.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged as a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFLNCE, LFLNCE, SFENCE, RDTSC, RDTSCP, etc.).

The following instructions will abort transactional execution on any implementation:

XABORT

CPUID

PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.
VMX: VMPTRLD, VMPTRST, VMCLEAR, VMREAD, VMWRITE, VMCALL, VMLAUNCH, VMRESUME, VMXOFF, VMXON, INVEPT, and INVVPID.
SMX: GETSEC.
UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1 and 2 depict an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 116b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a backoff mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the operations of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|  | LHI | R0,0 | *initialize retry count=0 |
|---|---|---|---|
| loop | TBEGIN |  | *begin transaction |
|  | JNZ | abort | *go to abort code if CC1=0 |
|  | LT | R1, lock | *load and test the fallback lock |
|  | JNZ | lckbzy | *branch if lock busy |
|  | ... perform operation ... |  |  |
|  | TEND |  | *end transaction |
|  | ... ... ... ... |  |  |
| lckbzy | TABORT |  | *abort if lock busy; this |
|  |  |  | *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on retry count |
|  | ... potentially wait for lock to become free ... |  |  |
|  | J | loop | *jump back to retry fallback |
|  | OBTAIN | lock | *using Compare&Swap |
|  | ... perform operation ... |  |  |
|  | RELEASE | lock |  |
|  | ... ... ... ... |  |  |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| . . . perform operation . . . | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1

240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort operations. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

As previously described, transactional memory is designed to allow developers to mark the portions of their programs that modify the shared data as being "atomic." Each atomic block is executed within a transaction: either the whole block executes, or none of it does. Within the atomic block, the program can read the shared value without locking it, perform all the computations it needs to perform, and then write the value back. At the end, it commits the transaction. The transactional memory system checks to see if the shared data has been modified since the atomic operation was started. If it hasn't, the commit may make the update and the thread may carry on with its work. If the shared value has changed, the transaction is aborted, and the work the thread performed is rolled back.

One current method of accelerating execution of programs is speculative execution. Speculative execution is an optimization technique where a computer system performs a task that it anticipates may be needed in the future. The main idea of speculative execution is to have a processor do work before it is known whether that work will actually be needed at all. Doing the work ahead of time may prevent a delay that may have to be incurred later (i.e., by doing the work after it is known that the work is in fact needed). If it turns out the work was not needed after all, any changes made by the work are reverted and the results are ignored. The target is to provide more concurrency if extra resources are available. This technique is employed in a variety of areas, including branch prediction in pipelined processors, prefetching memory and files, and optimistic concurrency control in a database system.

Speculation may lead to accelerated processing by improving cycles per instruction (CPI). However, within transactions, misspeculated paths may cause the transaction's footprint to increase by introducing additional read and write accesses to a transaction's read and write sets since transactional execution keeps track of all the memory addresses that the transaction has referenced so that another transaction cannot reference the same memory location. As such, these unnecessary additions to a transaction's read and/or write sets may lead to either a capacity induced fail or a false interference with a request from another processor/transaction. Therefore, it is desirable to eliminate and/or minimize the number of false entries.

In accordance with embodiment, memory operations (i.e., memory instructions having operands in memory in a processor pipeline) may only be executed when they are in an access-for completion (AFC) mode (i.e., speculation throttling mode is enabled) and the memory instructions are next to complete (NTC), or close to complete. Conversely, memory operations (i.e., memory instructions having operands in memory in a processor pipeline) may be executed speculatively, when they are not in an access-for completion (AFC) (i.e., speculation throttling mode is not enabled). This may eliminate execution of speculative memory accesses. In one aspect of the present embodiment, the requirement for memory instructions to be next or close to completion is enforced adaptively, responsive to a speculation-throttle indication. Speculation throttle indication may be responsive to (i.e., including but not limited) to one or more of the following: an indication in the system that a transaction has failed and needs to be executed non-speculatively (e.g., for constrained transactions, or because a transaction is being retried); an excessive transaction abort rate in the system, or under control of the application (e.g. with a perform processor assist (PPA) instruction—or other speculation control instruction—either explicitly selecting speculation throttling; or in conjunction with a non-specific PPA request), either after a transaction has failed for the first time, or proactively prior to executing a transaction (e.g., because the transaction is known to a programmer as triggering excessive speculation). In different embodiments, a PPA instruction—or other such instruction—may permanently enable speculation throttle indication, indicate it for the next transaction only, or select one or the other under programmer control.

Figure 4A:
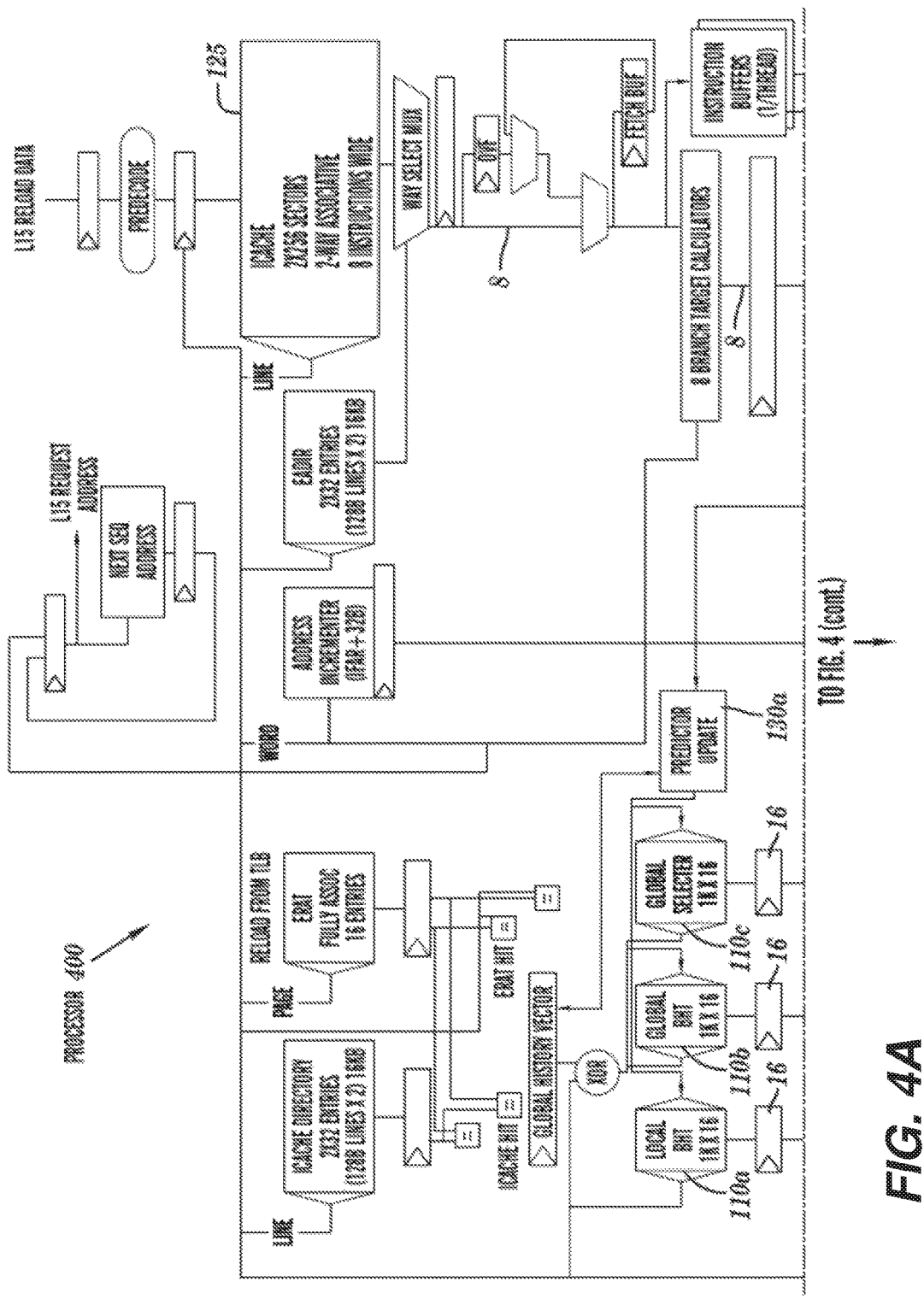
FIG. 4 depicts a conventional processor with predictor update logic, in accordance with the present embodiment.
Figure 4B:
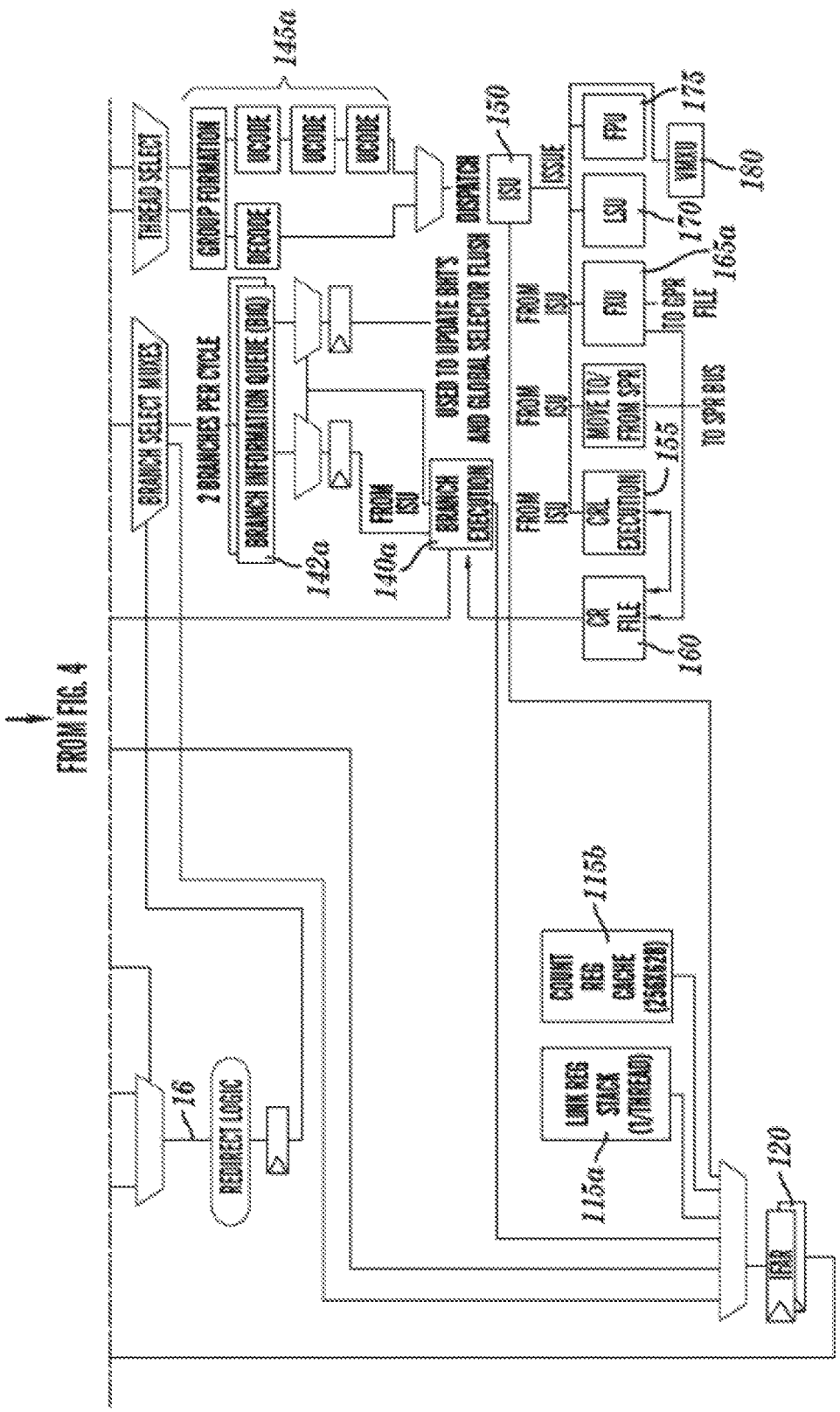

For illustrative purposes, FIG. 4 depicts a conventional processor 400 (i.e., a pipelined processor) with predictor update logic. The processor 400 includes, among other things, prediction hardware, registers, caches, decoders, group formation 145*a*, an instruction sequencing unit (ISU) 150, a load store unit (LSU) 170, and instruction execution units. In particular, the prediction hardware includes Local Branch History Table (BHT) 110*a*, Global Branch History Table (BHT) 110*b*, and Global Selector 110*c*. The prediction hardware is accessed through an Instruction Fetch Address Register (IFAR) 120, which has the address for the next instruction fetch. In one embodiment, an instruction cache 125 fetches a plurality of instructions referred to as a "fetch group".

The cache and prediction hardware are accessed at approximately the same time with the same address. If the prediction hardware has prediction information available for an instruction in the fetch group, that prediction is forwarded to the ISU 150, which, in turn, issues instructions to units for execution. The prediction may be used to update the IFAR 120 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to the ISU 150.

The Branch Execution Unit (BRU) 140*a* operates in response to instructions issued to it by the ISU 150. The BRU 140*a* has read access to the condition register file 160. The Branch Execution Unit 140*a* further has access to information stored by the branch scan logic in the Branch Information Queue (BIQ) 142*a*, to determine the success of a branch prediction, and is operatively coupled to the instruction fetch address register(s) (IFAR) 120 corresponding to the one or more threads supported by the microprocessor. In accordance with at least one embodiment, BIQ entries are associated with, and identified by an identifier, e.g., by a branch tag BTAG. When a branch associated with a BIQ entry is completed, it is so marked. BIQ entries are maintained in a queue, and the oldest queue entry (entries) is/are de-allocated sequentially when they are marked as containing information associated to a completed branch.

The BRU 140*a* is further operatively coupled to cause a predictor update when the BRU 140*a* discovers a branch misprediction.

When the instruction is executed, the BRU 140*a* detects if the prediction is wrong. If so, the prediction needs to be updated. For this purpose, the processor in FIG. 4 also includes predictor update logic 130*a*. The predictor update logic 130*a* is responsive to an update indication from Branch Execution Unit 140*a* and configured to update array entries in one or more of the Local BHT 110*a*, Global BHT 110*b*, and Global Selector 110*c*. The predictor hardware 110*a*, 110*b*, and 110*c* may have write ports distinct from the read ports used by the instruction fetch and prediction operation, or a single read/write port may be shared. The predictor update logic 130*a* may further be operatively coupled to the link stack 115*a* and counter register stack 115*b*.

Referring now to the condition register file (CRF) 160, the CRF 160 is read-accessible by the BRU 140*a* and can be written by execution units including but not limited to the Fixed Point Unit (FXU) 165*a*, Floating Point Unit (FPU) 175 and Vector Multimedia eXtension Unit (VMXU) 180. The Condition Register Logic Execution unit (CRL execution) 155 (also referred to as the CRU) and SPR handling logic have read and write access to the Condition Register File (CRF) 160 (access to CRF 160 from SPR handling logic not shown in the interest of simplifying illustration). The CRU 155 performs logical operations on the condition registers stored in the CRF file 160. The FXU 165*a* is able to perform write updates to the CRF 160.

Figure 5:
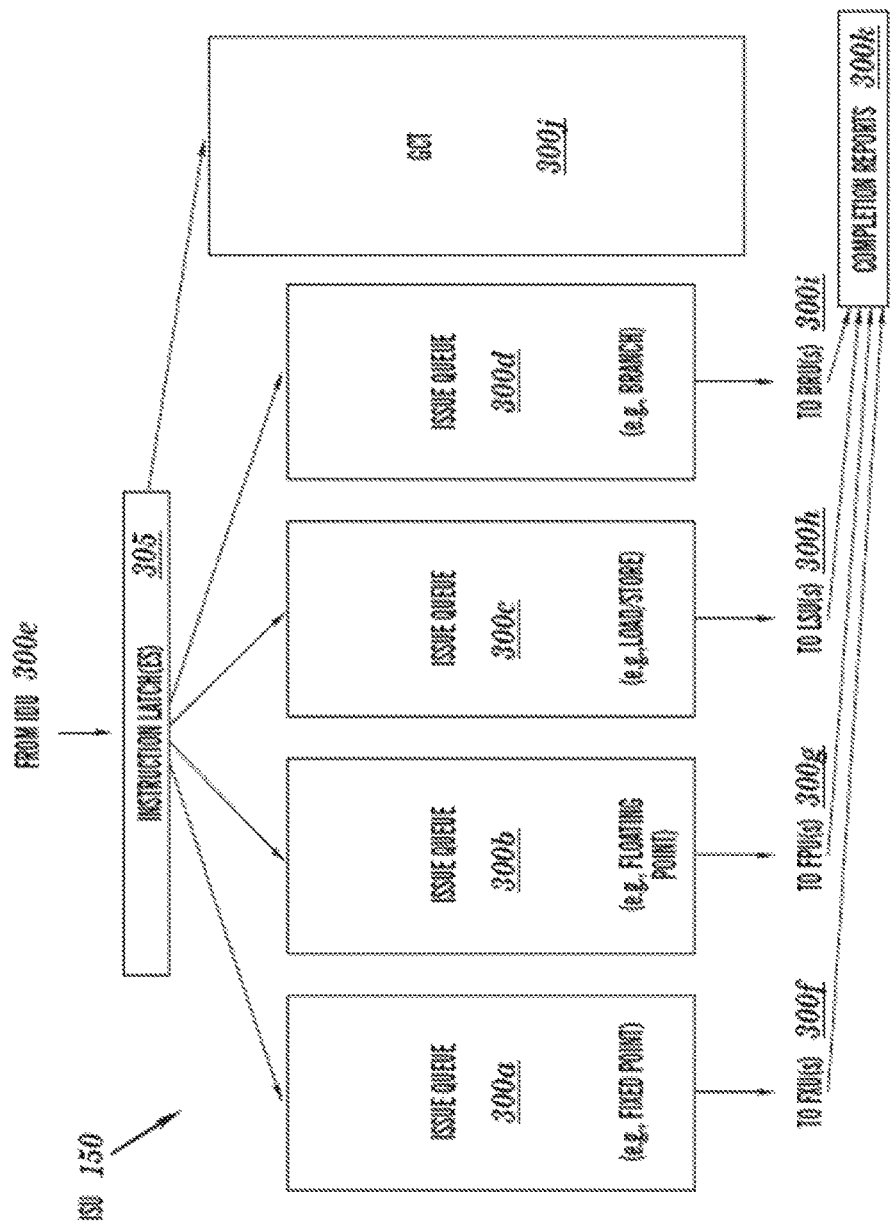
FIG. 5 depicts an exemplary instruction tracking apparatus in an exemplary instruction sequencing unit (ISU), in accordance with the present embodiment.

Referring now to FIG. 5, an exemplary instruction sequencing unit (ISU) 150 in accordance with the present embodiment is depicted. The instruction sequencing unit (ISU) 150 is the unit of the processor 400 (FIG. 4) that is responsible for deciding when to start executing a specific instruction. The ISU 150 works by receiving one or more instructions from an instruction decode unit (IDU) 300*e*. The ISU 150 may typically capture the received instructions into one or more instruction latches 305. Then the ISU 150 may place the instructions into one or more issue queues 300*a*-300*d*. The issue queues 330*a*-330*d* are lists of pending instructions that need to be executed. Each issue queue 330*a*-330*d* has scheduling logic associated with it that may decide which instruction should be executed next based on respecting dependencies (e.g. making sure instructions only get executed when all their inputs are available and with a goal of executing all the oldest instructions first so they may complete).

There may be a number of issue queues 300*a*-300*d* as shown with respect to FIG. 5. According to at least embodiment, each type of instruction, such as a fixed point 300*a*, a floating point 300*b*, a load/store 300*c*, or a branch 300*d* may have a separate issue queue 300*a*-300*d* as depicted in FIG. 5. However according another implementation, multiple issue queues 300*a*-*d* may be present for the same class. For example, there may be two separate floating point issue queues 300*b*. In another implementation, multiple units may share one issue queue 300*a*-300*d*. Once an instruction is selected, it is sent to its corresponding execution unit 300*f*-300*i*. The execution units may be a fixed point unit (FXU) 300*f*; a floating point unit (FPU) 300*g*; a load store unit (LSU) 300*h*; and a branch unit (BRU) 300*i*. A global completion table (GCT) 300*j* is also depicted. The GCT 300*j* is a general tracking mechanism that may track which instructions in the issue queue 300*a*-300*d* have completed. GCT 300*j* may receive completion reports 300*k* from the various execution units 300*f*-300*i* and may ultimately be responsible for reallocating resources in a processor 400 (FIG. 4) when all the oldest instructions have executed in the order of the original program.

Figure 6:
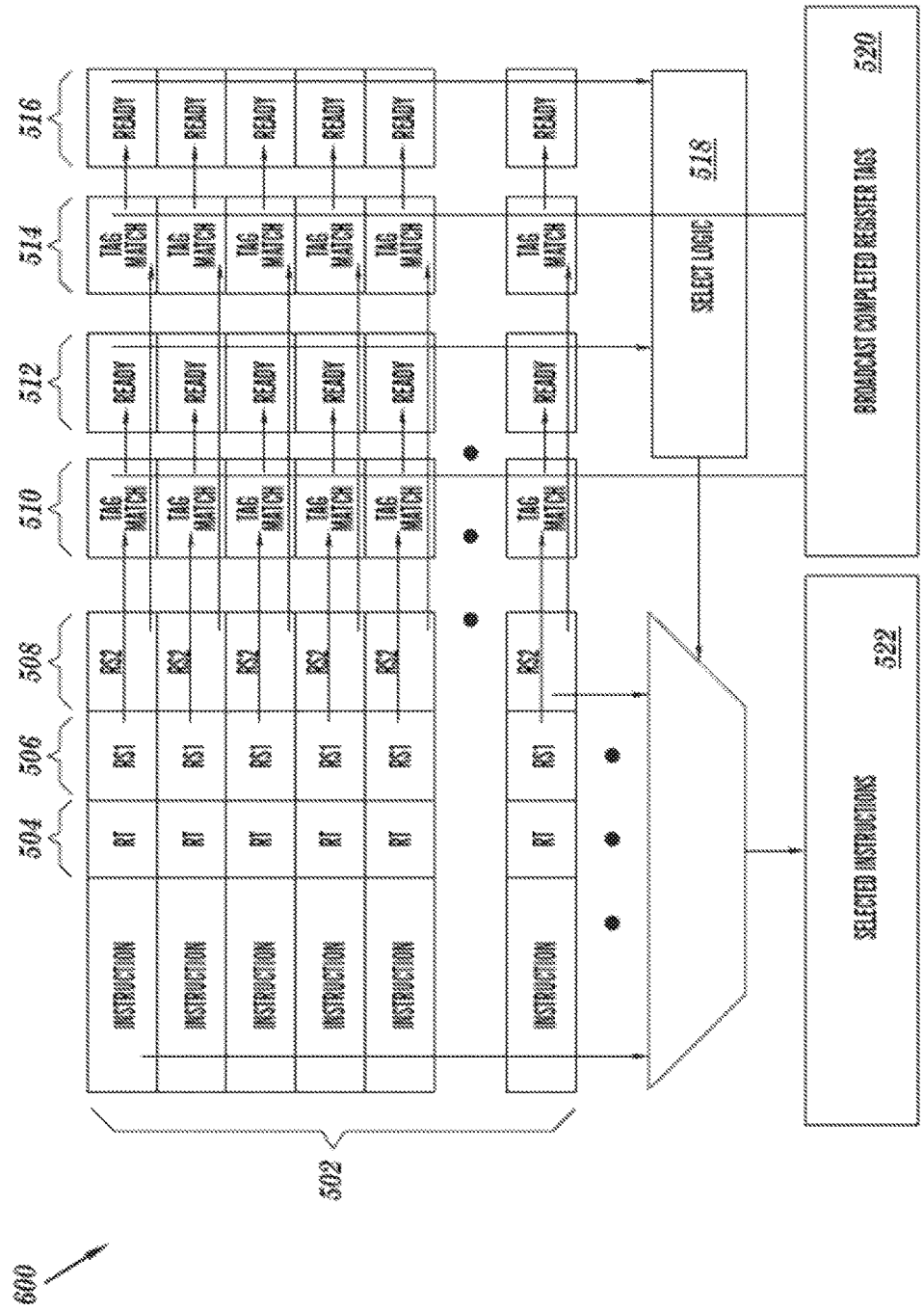
FIG. 6 depicts an exemplary implementation of an issue queue and instruction selection in instruction sequencing unit (ISU), in accordance with the present embodiment.

Referring now to FIG. 6, an exemplary issue queue of an instruction sequencing unit (ISU) 600, in accordance with the present embodiment is depicted. According to one implementation, an issue queue 600 may be designed to include a list of instructions 502 that are in the issue queue 600 in conjunction with target register specifiers (RT) 504 and source register specifiers (RS1) 506 and (RS2) 508. Each of the source register specifiers 506, 508 may be coupled with tag match logic 510, 514 and a ready indication 512, 516 as to whether an input operand is ready. This may be a way of determining whether an instruction is ready and has all its inputs available (i.e., whether all the inputs have been computed for that instruction) and whether that instruction may be selected (i.e., selected instruction 522) by the select logic 518 to execute out of order.

Furthermore, every time an instruction 502 finishes execution and writes its result to the specified target register RT, the instruction's results tag RT corresponding to its result register(s) are broadcast 520 to all other instructions. For example, an instruction 502 may write to register 2 as its target (RT) 508 and another instruction 502 may be waiting for register 2 as its second input operand (RS2) 508, as such, the select logic 518 may be able to determine that the input is now available and the pending instruction 502 may have become ready to issue. As such, the select logic 518 may be tracking all the dependencies. Additionally, the select logic 518 may look at all the indications in the instruction 502 and, at least in one aspect of the present embodiment, may select one or more of the oldest instructions after all of the operands are ready to be executed. Then the select logic 518 may select those instructions 522 and send the instructions 502 to the various execution units 300*f*-300*i* (FIG. 5).

Currently, when a speculatively executed memory instruction is undone (rolled back) and removed (i.e., flushed) from the processor 400 (FIG. 4), the memory instruction may leave behind the memory instruction's address in the read and write sets. However, according to embodiment, out of order execution may be throttled (i.e., limited) for memory instructions to prevent the excessive inclusion of addresses in transaction read or write sets due to mispeculation when later the speculation is rolled back (i.e., the speculation is undone). As such, over-speculation may not produce the extraneous memory addresses to read and write sets due to misspeculation. For example, the out of order execution throttling may be implemented as a mode in a processor 400 (FIG. 4) that may always be enabled or may only be enabled when excessive misspeculation is detected. For example, performance may be degrading by introducing false interferences (i.e., when a collision between two transactions is detected because they refer to the same memory references). As such a mode of adaptiveness may be used in conjunction with at least on embodiment to trigger the new operating mode of out of order execution throttling or not depending on whether excessive interference based on misspeculation may be a problem. One advantage of implementing the out of order execution throttling mode adaptively is to be able to enable and disable the out of order execution throttling mode as necessary. For example, limiting speculation may negatively impact performance, however if there is too much speculation, then the excessive speculation may negatively impact performance as well.

Typically today, processors 400 (FIG. 4) perform speculation to accelerate the processing by determining which instructions will be executed next and then trying to execute them before it may be established or proven that those instructions may in fact need to be executed. Usually speculation may lead to performance gain because work is started earlier and therefore the work may be completed earlier. However, when excessive speculation is performed, it may interfere with the progress of other work since later, it may be determined that the speculatively executed work should not have been performed. As such, there may be no gain in having performed the speculation, but rather a negative impact resulting from the interference with the actual current work that is being performed may have occurred. In particular, and in reference to the maintenance of read and write sets associated with transactions, speculation can lead to the over-indication of a transaction's read and write sets. As such, it may be helpful to detect and limit the speculation in situations such as excessive speculation. One implementation of an adaptive mode may be to speculate aggressively initially, but if too much interference is detected, then the out of order execution throttling mode (i.e., the speculation throttling mode) may be initiated. However, according to another implementation, the speculation throttling mode may always be present.

The instruction sequencing unit (ISU) 150 (FIG. 5) may have instructions 502 (FIG. 6) coming in and typically those instructions in instruction latches 305 (FIG. 5) may immediately be dispersed into the issue queues 300*a*-300*d* (FIG. 5) and marked in the GCT 300*j* (FIG. 5) so they become eligible to be executed out of order. However, some instructions 305 (FIG. 5) may need to be executed in order and typically those instructions 305 (FIG. 5) may be marked to execute as next to complete (NTC). As such, when those instructions of instruction latch(es) 305 (FIG. 5) marked as NTC arrive in the instruction sequencing unit (ISU) 150 (FIG. 6), they may not be dispersed into the issue queues 300*a*-300*d* (FIG. 5) from the instruction latches 305 (FIG. 5), but rather the instructions may be stored in the instruction latches 305 of the instruction sequencing unit (ISU) 150 (FIG. 5) and the processor 400 (FIG. 4) may wait until all the previous instructions 502 (FIG. 6) in issue queues 300*a*-*d* have been executed. The ISU 150 (FIG. 5) then may know that the pending instruction at the top of the ISU 150 in instruction latch(es) 305 (FIG. 5) is the NTC instruction 502 (FIG. 6) because there are no instructions 502 (FIG. 6) left in any of the issue queues 300*a*-300*d* (FIG. 5) and in the GCT 300*j* (FIG. 5) where instruction tracking of instructions 502 in issues queues 300*a*-*d* is performed in conjunction with the tracking of the instructions 502 (FIG. 6). However, a disadvantage of this method of ensuring in-order execution of instructions marked NTC may be that all the instructions that are behind an instruction 502 (FIG. 6) that is marked NTC may be prevented from coming into the ISU 150 (FIG. 5). Therefore, when a NTC instruction is in the instruction latch 305 (FIG. 5), all subsequent instructions in the program are blocked from executing because the instruction of instruction latch(es) 305 (FIG. 5) that is marked as NTC acts as a barrier for all future instructions that may be received from IDU 300*e* (and more specifically shown as decode logic 145*a* in FIG. 4). As a result, speculation may be limited further by preventing all instructions following an instruction marked NTC to be executed out of order with respect to an NTC instruction.

According to at least one embodiment, memory load and store instructions may only be executed when the instructions are marked NTC or close to completion (e.g., close to NTC). Memory instructions 502 (FIG. 6) within a transaction may be marked as being NTC and may be held at the instruction latch 305 (FIG. 5) until the GCT 300*j* (FIG. 5) is not holding any pending instructions (i.e., the speculation throttling mode is active). As such, dependent instructions 502 (FIG. 6) and further instructions 502 (FIG. 6) behind a NTC or close to NTC instruction 502 (FIG. 6) marked instruction 502 (FIG. 6) are queued; therefore, preventing out of order execution (i.e., speculative execution) with respect to other instructions 502 (FIG. 6) in the program sequence.

However, performance may negatively be impacted since every time a memory load or store instruction is encountered within a transaction while the throttling mode is active, all further instructions may be prevented from executing (i.e., those instructions that are behind that memory load or store instruction marked as NTC). As a result, the memory load or store of the transaction that is marked as NTC may stay in the instruction latch 305 (FIG. 5), and any future instructions may be prevented from coming into the ISU 150 (FIG. 5). As such, other implementations of the present embodiment may allow more speculation to occur while still limiting speculation with respect to memory load and store instructions.

Figure 7:
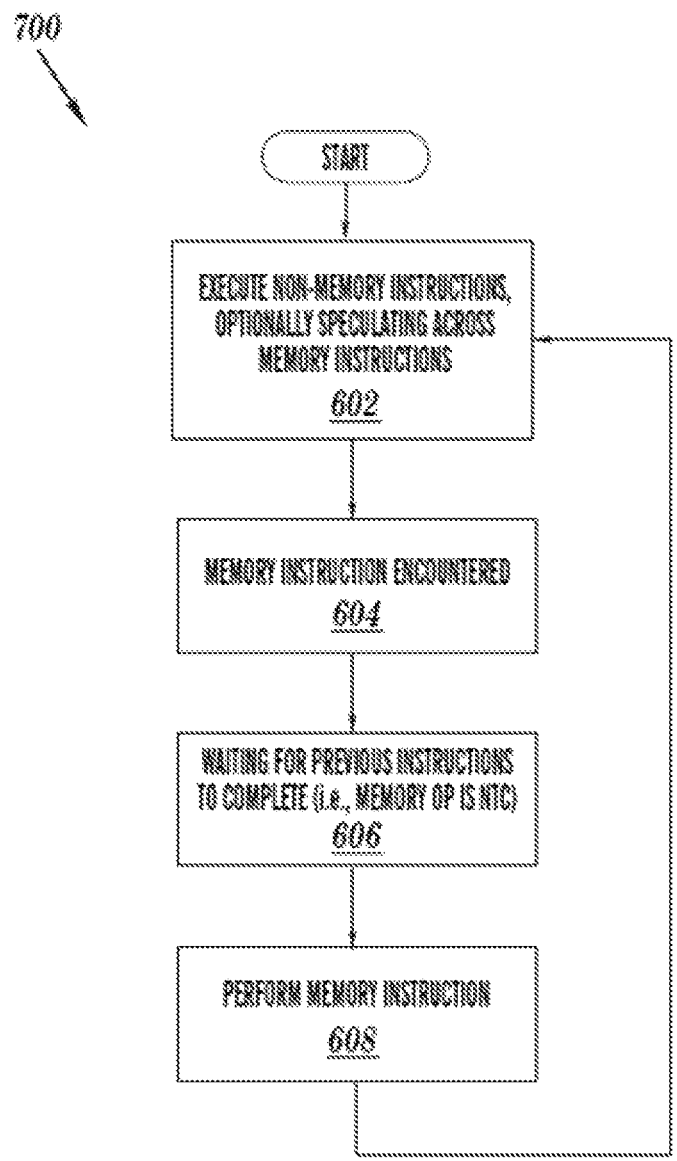
FIG. 7 depicts an operational flowchart illustrating the operations carried out by a program to improve memory performance when next to complete (NTC) speculation throttling is engaged, in accordance with the present embodiment.

Referring now to FIG. 7, an operational flowchart 700 illustrating the operations carried out by a program to improve memory performance when engaging next to complete (NTC) speculation throttling is depicted. As such, more speculation may be allowed within the processor. As described above, throttling may be performed by forcing memory instructions to be NTC. In accordance with at least one embodiment, speculation throttling applies to memory load and store instructions when they are within a transaction, but not to prefetch or other such memory hint instructions that are not tracked as part of transactional read and write sets. In other embodiments, all memory instructions within a transaction are affected. NTC speculation throttling may be engaged either by hardware, or under the control of a speculation mode control instruction. A speculation mode control instruction may be any assist instruction to help transaction execution in accordance with known prior methods or a new instruction. According to at least embodiment, the speculation control instruction may be a transaction speculation control enable instruction.

At 602, non-memory instructions may be executed, optionally speculating across memory operations ahead of time to accelerate execution. For example, there may be long running instructions, such as divide, floating point operations, address computation leading to further memory operations, or other instructions might benefit from being started early if they are independent of the memory instruction. In one embodiment, as previously described, ISU 150 (FIG. 4) and instruction latch 305 (FIG. 4) may hold an instruction marked as NTC (i.e., an AFC mode setting instruction that causes an instruction defined value to be set as an AFC mode value.) In one such embodiment, a memory load or store that is marked as NTC in a transaction when the speculation throttling mode is enabled does not allow speculation across that memory instruction.

In another embodiment, non-memory instructions may be speculated far in advance, but the memory instructions may not be speculated far in advance and are allowed to execute only when they are next to complete, or close to complete (in accordance with a definition of close to complete for a specific implementation, such as including, but not limited to: not further than n instructions from completion, not further than n branches from completion, not further than n unresolved branches from completion, for a variety of possible values of n, and including 0). For example, all of the non-memory instructions may be executed ahead of the memory instructions. Then the memory instructions may be executed at the in-order point (i.e., or close to the in-order point to allow for a small amount of speculation).

Therefore, at 604, a memory instruction may be encountered. Then, according to one implementation, at 606, the method may wait for all the previous non-memory instructions ahead of the memory instruction to complete. Once all the previous non-memory instructions have completed, the method may continue at 608 with the execution of that particular memory instruction that it has encountered at the in-order point (or close to the in-order point). Then the method may continue back to 602 to select other instructions and continue with speculative execution.

In one embodiment previously described with respect to FIG. 6, when speculation throttling mode is enabled, memory instructions (and in at least one embodiment, preferably memory load and store instructions) are marked as requiring NTC completion. In another embodiment implementing compute instructions with memory operands, all instructions having at least one memory read operand are treated as memory load instructions. For example, any operand that has read-accesses memory as an operand (e.g., ADD R2, 2(r4)—i.e., add the content of memory location at r4+2 to the contents of register r2) should be handled as a load instruction. This includes executed as NTC, but it also includes being executed as close to completion, after preceding branches have been verified to generate a prefetching operation for such a memory operand.

In said another embodiment implementing compute instructions with memory operands, all instructions having at least one memory write operand are treated as memory store instructions. In one embodiment operating in conjunction with the ISU structure of FIG. 5 and issue queues 300a-300d in accordance with the issue queue architecture of FIG. 6, memory instruction marked for NTC completion are held in instruction latch 305 (FIG. 5) until they are eligible to execute when they are next to complete. In such an embodiment, these instructions thereby act as a barrier and prevent new instructions from entering into the ISU 150 (FIG. 5). Since there is an instruction already in the instruction latch 305 (FIG. 5), the future instructions may be blocked from entering and all future instructions may be prevented from being speculatively executed, leading to significant—and possibly excessive—reduction of speculation near memory instructions in transactions, when speculation throttling mode is enabled.

At least embodiment is designed to enable execution of non-memory instructions subsequent to a memory instruction in a transaction subject to speculation throttling out of order with respect to said memory instruction, According to at least one such embodiment, a load and store issue queue 300a-300d (FIG. 5) is modified to issue memory instructions only when they are NTC within a transaction when the speculation throttling mode has been enabled. As such, memory instructions in a transaction when the throttling mode is enabled, are no longer held in the instruction latch 305 (FIG. 5), but are allowed to enter the issue queue 300c (FIG. 5). Furthermore, any instructions following that memory instruction may be allowed to go to their respective issue queues 300a-300d (FIG. 5) and execute out of order. To ensure that the memory load and stores may still be executed when they are NTC, the load and store issue queue (LSU) may be modified to only execute transactional loads and stores in-order (when they are at their in-order point) according to one implementation.

Figure 8:
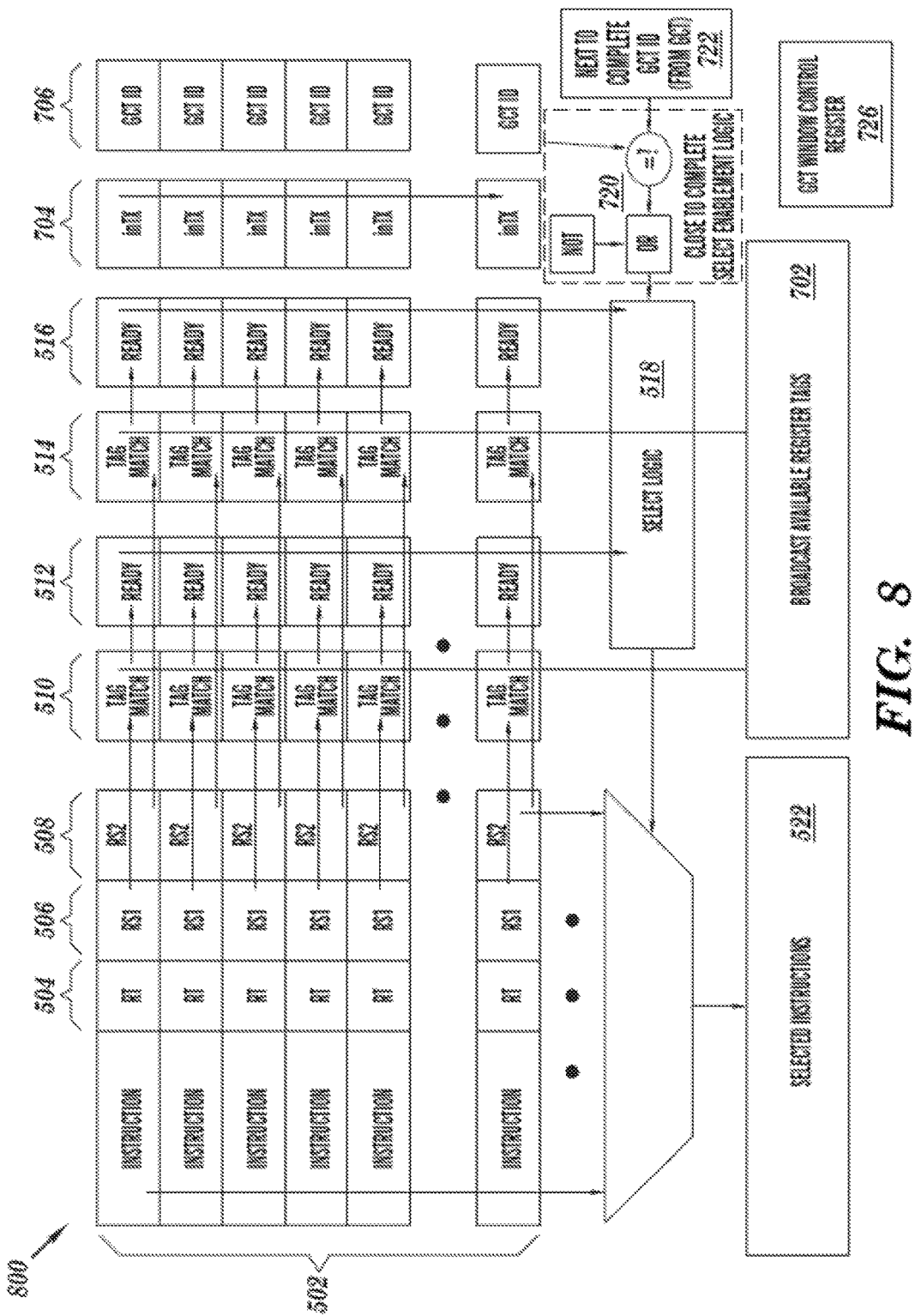
FIG. 8 depicts a modified load and store unit (LSU) issue queue, speculating across memory instructions, in accordance with the present embodiment.

Referring now to FIG. 8, a modified load and store unit (LSU) issue 800 queue is depicted. In accordance with one embodiment, the issue queue of FIG. 8 enables speculating across memory instructions in accordance with the present embodiment by implementing next-to-complete or close-to-complete function in the load/store issue queue while allowing instructions subsequent to so-marked instructions to be entered into their respective issue queues and become eligible for execution out of order with respect to their program order and with respect to memory instructions required to execute in order, as previously described with respect to the optional aspects of step 602 (FIG. 7). Thus, with respect to the modified LSU issue queue depicted in FIG. 8, memory instructions marked to execute in-order when they are next-to-complete are not required to be held in the instruction latch 305 (FIG. 5). Advantageously, these instructions will not be acting as a barrier preventing subsequent instructions from entering the ISU by way of instruction latch(es) 305, from being dispersed into issue queues 300a, 300b, 300d, etc and from becoming eligible for out of order execution. The first modification to the LSU issue queue (as depicted in FIG. 8) is targeting the authority to speculate other instructions which may be done by allowing memory loads and stores from transactions, where the throttling is active, to go to their respective issue queue such that the instruction latch 305 (FIG. 5) becomes available again to receive additional instruction. As such, the issue queue may be modified to enforce that a memory load and store in a transaction may only executed when they are non-speculative (i.e., in order and NTC).

In accordance with one implementation of an LSU issue queue enforcing in-order execution for memory load and store instructions subject to speculation throttling, the LSU issue queue includes two additional fields associated with each of the instructions in the issue queue. One field may be a one bit indication that an instruction is inside a transaction and subject to the speculation throttling mode (inTX) 704. The inTX 704 field may differentiate between an instruction inside a transaction (i.e., inTX 704), from an instruction that is not inside a transaction. The inTX 704 field may also determine when the speculation throttling mode is not enabled and as such, the instructions may be performed out of order. Therefore, the inTX 704 may indicate for each instruction 502 in the issue queue whether said instruction is in a transaction with throttling mode enabled or not. In one embodiment, indicator inTX 704 is used as an input in the select logic so that any instruction that isn't in a transaction with speculation throttling enabled may always execute out of order in accordance with methods currently used.

In at least one embodiment, each GCT entry is uniquely identified by a Global Completion Identifier (GCT ID). Furthermore, in an exemplary embodiment, each issue queue entry further contains a Global Completion Identifier (GCT ID) 706 in addition to the inTX 704 field. The GCT ID 706 may point to an entry in the global completion table GCT 300j (FIG. 5). The GCT 300j (FIG. 5) may keep track of all the instructions in progress and which are the oldest instructions that are about to complete successfully. Therefore, an instruction is non-speculative when it is the oldest instruction in the GCT 300j (FIG. 5). Although the issue queue may execute instructions as early as possible, the GCT 300j (FIG. 5) ensures that even if an instruction executes out of order, each instruction completes according to the original program order. An instruction is at its in-order point (i.e., NTC) when that instruction corresponds to an instruction (or instruction group) that is at the head of GCT 300j (FIG. 5) as next to complete.

In accordance with the issue queue design 800 of FIG. 8, an instruction is eligible to be selected as selected instruction 522 by selection logic 518 when all its input operands are marked as ready (columns 512 and 516) and an instruction is not marked by indicator 704 as being in a transaction with speculation throttling. Alternatively, a transaction can be selected when indicator 704 is set, and the instruction is the oldest element in issue queue 800 (i.e., at the bottom row), and its GCT ID matches the GCT ID of the next instruction (or, instruction group) to complete from the GCT. In another embodiment, memory instructions are eligible when they are within the bottom n instructions of issue queue 800, and match either the GCT ID at the head that is next to complete, or, optionally, one of a plurality of GCT IDs representing instructions (instruction groups) that are next to complete, or near to complete.

Therefore, when a memory load and store instruction is in a transaction, speculation throttling may be enabled to ensure the instruction is executed in order when it is next-to-complete, i.e., when the GCT ID 706 the instruction has matches the ID of the next to complete instruction at the head of the GCT 300j (FIG. 5). As such, that instruction is the next instruction to complete. The issue queue may receive the next to complete GCT ID 722 regarding the next to complete instruction from the GCT table 300j (FIG. 5) and if that id matches the id 706 of the current instruction then the issue queue may determine that the current instruction is the NTC instruction since that instruction is the next in line according to the GCT 300j (FIG. 5). Summarily, logic to determine in-transaction status, speculation throttling and/or GCT ID match represents "close to complete select enablement logic" 720 which qualifies candidate instructions 502 from an exemplary load and store issue queue 300c to be selected or not selected by select logic 518. In at least one embodiment, close to complete select enablement logic 720 is operatively coupled to a GCT window control register 726 controlling when a memory load or store operations is eligible to be issued as being next to or close to complete in conjunction with methods of logic 722.

Figure 9:
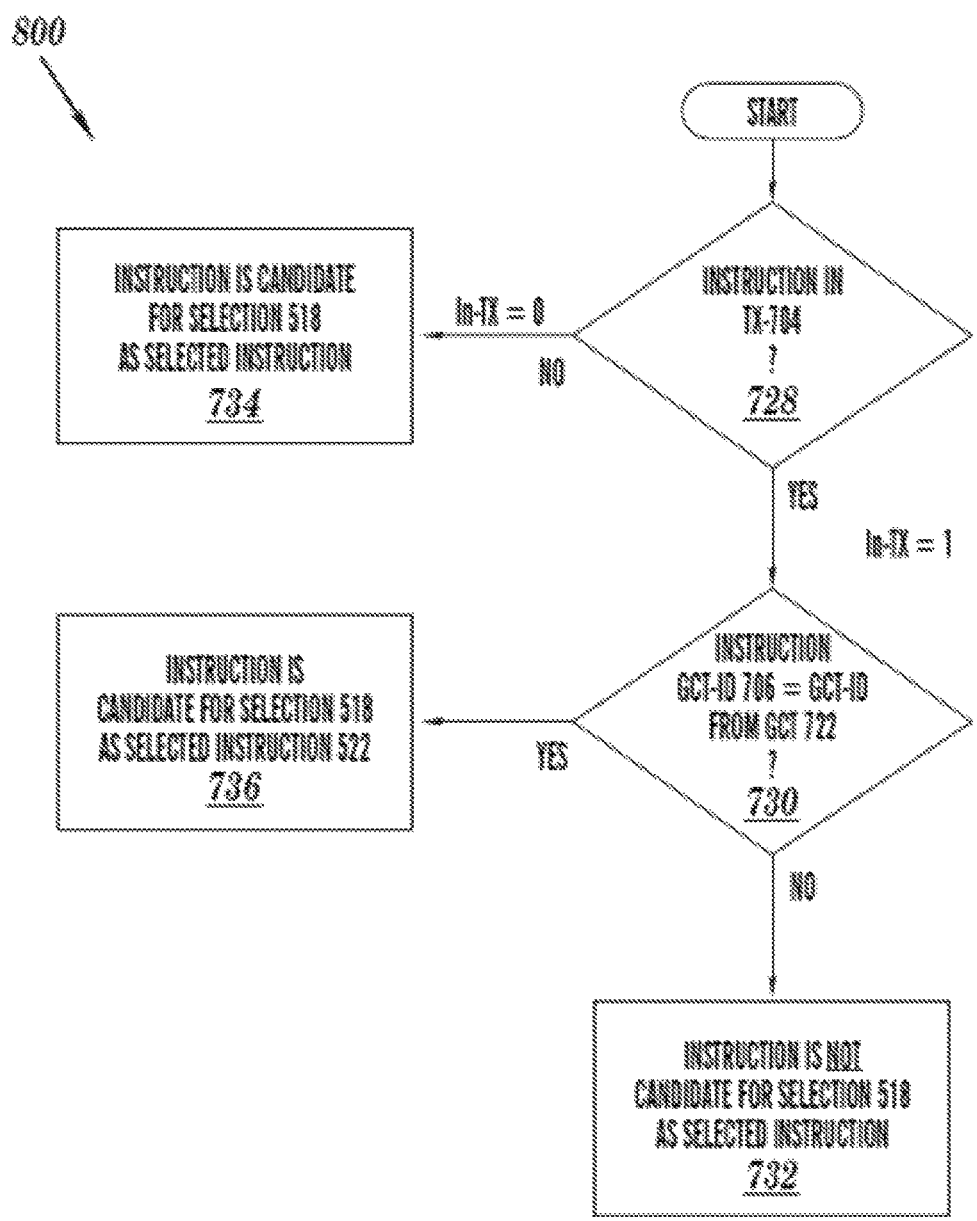
FIGS. 9-11 depict an operational flowchart illustrating the logic for a window control register, in accordance with the present embodiment.
Figure 10:
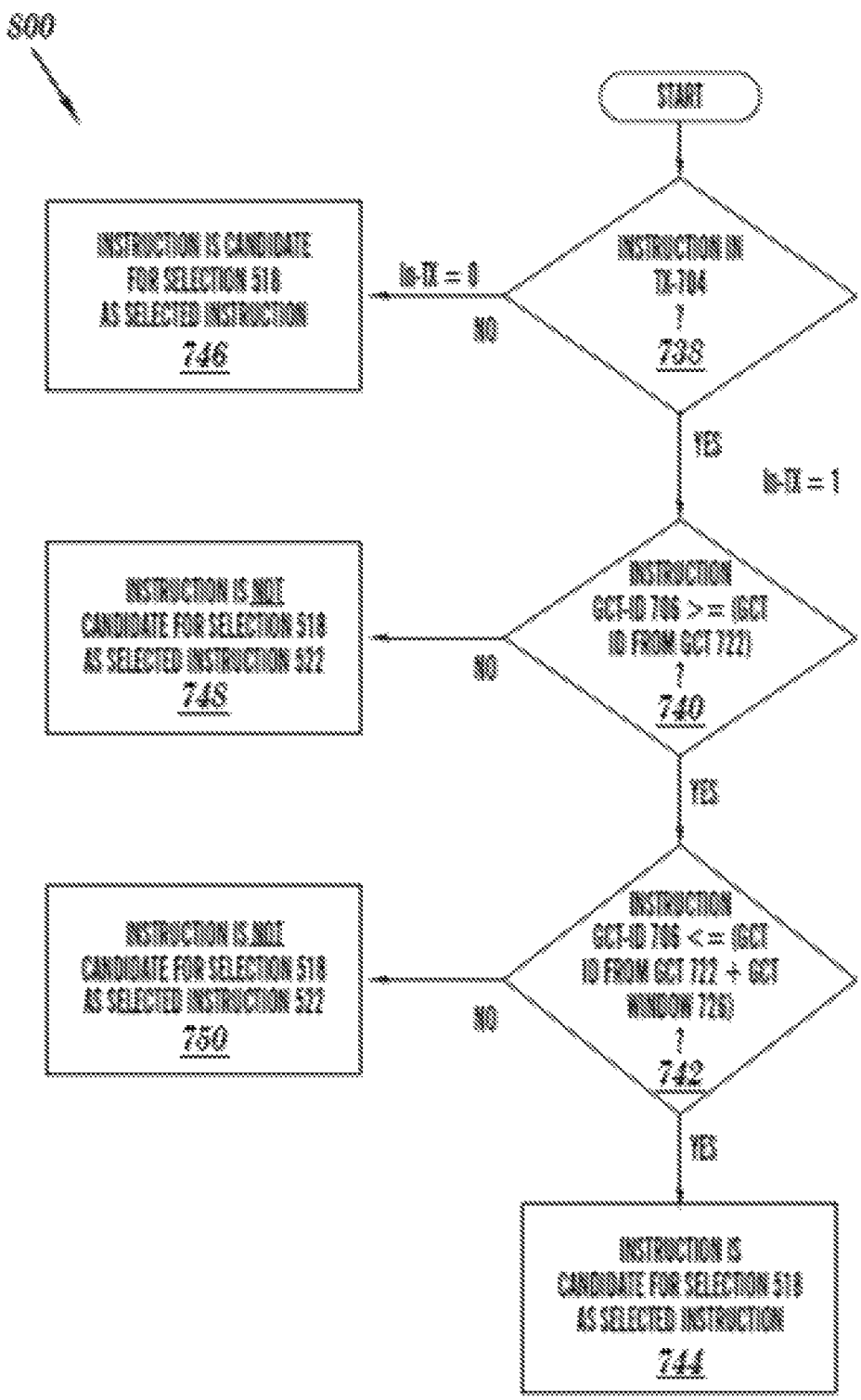
Figure 11:
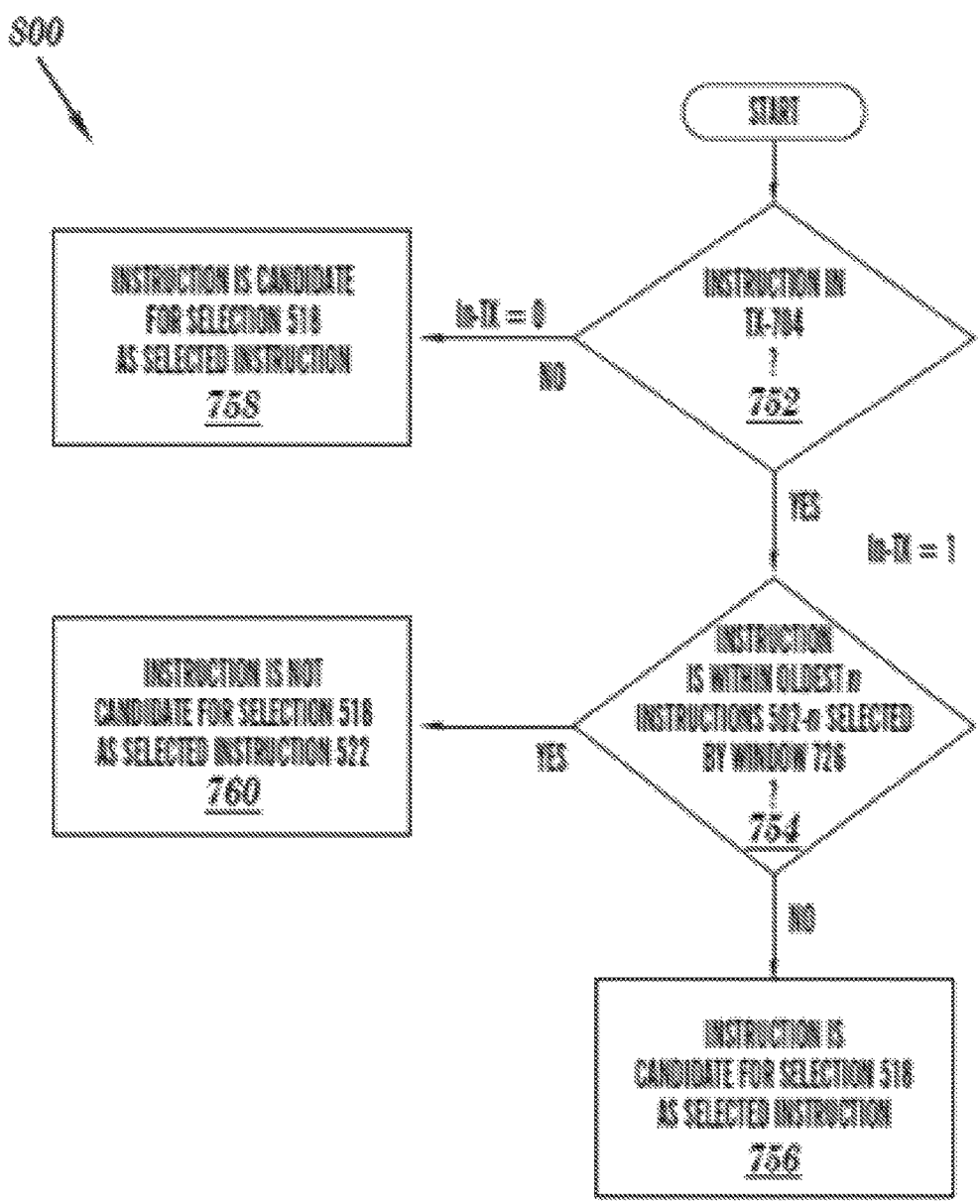

Referring now to FIGS. 9-11, operational flowcharts 800 illustrating the logic for logic 720. Logic 722 operates in conjunction with a window control register 726, in accordance with the present embodiment are depicted. The GCT window control register 726 (FIG. 8) may be set by an application or system programmer A special purpose register may be used. For example, using the mtspr instruction of the Power ISA architecture may be used, e.g., including a transfer to a next to complete window (NTCW) special purpose register from a general purpose register:

mtspr NTCW, R2

In another embodiment, a load control register instruction may be used. In another embodiment, a suitable value for control register 726 may be determined by a manufacturer and may be loaded by a scan chain, from serial EEPROM, or by other means during system initialization. In another embodiment, the window specification is determined at design time and tangibly represented in circuitry.

Referring now to FIG. 9, a flowchart for logic 720 (FIG. 8) is illustrated in accordance with at least one implementation of the present embodiment. At 728, it is determined whether the instruction is in-transaction 704 (FIG. 8), or in another embodiment is in a transaction that is subject to speculation throttling, and if it is false (i.e., In-TX=0), then, at 734, the instruction is determined to be a candidate for selection 518 (FIG. 8) as a selected instruction 522 (FIG. 8). However, if at 728, it is determined that the instruction is in-transaction 704 (FIG. 8) (i.e., In-TX=1), or in another embodiment is in a transaction that is subject to speculation throttling. then at 730, it is determined whether the instruction GCT ID 706 (FIG. 8) is equal to the GCT ID from GCT ID 722 (FIG. 8) and if it is true, then, at 736, the instruction is determined to be a candidate for selection 518 (FIG. 8) as a selected instruction 522 (FIG. 8). If, at 730, it is determined that the instruction GCT ID 706 (FIG. 8) is not equal to the GCT ID from GCT ID 722 (FIG. 8), then the instruction is not a candidate for selection 518 (FIG. 8) as a selected instruction 522 (FIG. 8) at 732.

Referring now to FIG. 10, a flowchart for logic 720 (FIG. 8) is illustrated in accordance with at least one implementation of the present embodiment. At 738, it is determined whether the instruction is in-transaction 704 (FIG. 8), or in another embodiment is in a transaction that is subject to speculation throttling. and if it is false (i.e., In-TX=0), then at 746, the instruction is determined to be a candidate for selection 518 (FIG. 8) as a selected instruction 522 (FIG. 8). However, if at 738, it is determined that the instruction is in-transaction 704 (FIG. 8) (i.e., In-TX=1), or in another embodiment is in a transaction that is subject to speculation throttling. then at 740, it is determined whether the instruction GCT ID 706 (FIG. 8) is greater than or equal to the GCT ID from GCT ID 722 (FIG. 8) and if it is false, then, at 748, the instruction is determined not to be a candidate for selection 518 (FIG. 8) as a selected instruction 522 (FIG. 8). However, if at 740, it is determined that the instruction GCT ID 706 (FIG. 8) is greater than or equal to the GCT ID from GCT ID 722 (FIG. 8), then at 742, it is determined whether the instruction GCT ID 706 (FIG. 8) is less than or equal to the sum of the GCT ID from GCT ID 722 (FIG. 8) the value of GCT window 726 (FIG. 8), i.e., whether it is in a window of n instructions in a first embodiment where a GCT ID uniquely identifies instruction, or whether it is in a window of n instruction groups in a another embodiment where a GCT ID uniquely identifies instruction groups, where n represents the value corresponding to the window size stored in GCT window 726, and if it is false, then, at 750, the instruction is determined not to be a candidate for selection 518 (FIG. 8) as a selected instruction 522 (FIG. 8). However, if at 742, it is determined that the instruction GCT ID 706 (FIG. 8) is less than or equal to the GCT ID from GCT ID 722 (FIG. 8)+GCT window 726 (FIG. 8), then at 744 the instruction is a candidate for selection 518 (FIG. 8) as a selected instruction 522 (FIG. 8).

Referring now to FIG. 11, a flowchart for logic 720 (FIG. 8) with pending instruction window is illustrated in accordance with at least one implementation of the present embodiment. At 752, it is determined whether the instruction is in-transaction 704 (FIG. 8), or in another embodiment is in a transaction that is subject to speculation throttling. and if it is false (i.e., In-TX=0), then, at 758, the instruction is determined to be a candidate for selection 518 (FIG. 8) as a selected instruction 522 (FIG. 8). However, if at 752, it is determined that the instruction is in-transaction 704 (FIG. 8) (i.e., In-TX=1), or in another embodiment is in a transaction that is subject to speculation throttling. then at 754, it is determined whether the instruction is within oldest n instructions 502 (FIG. 8)—where n is selected by window control register 726 (FIG. 8) and if it is true then at 760, the instruction is determined to be a candidate for selection 518 (FIG. 8) as selected instruction 522 (FIG. 8). If at 754, the instruction is determined not to be within oldest n instructions 502 (FIG. 8)—where n is selected by window control register 726 (FIG. 8), then at 756, the instruction is determined not to be a candidate for selection 518 (FIG. 8) as selected instruction 522 (FIG. 8).

Figure 12:
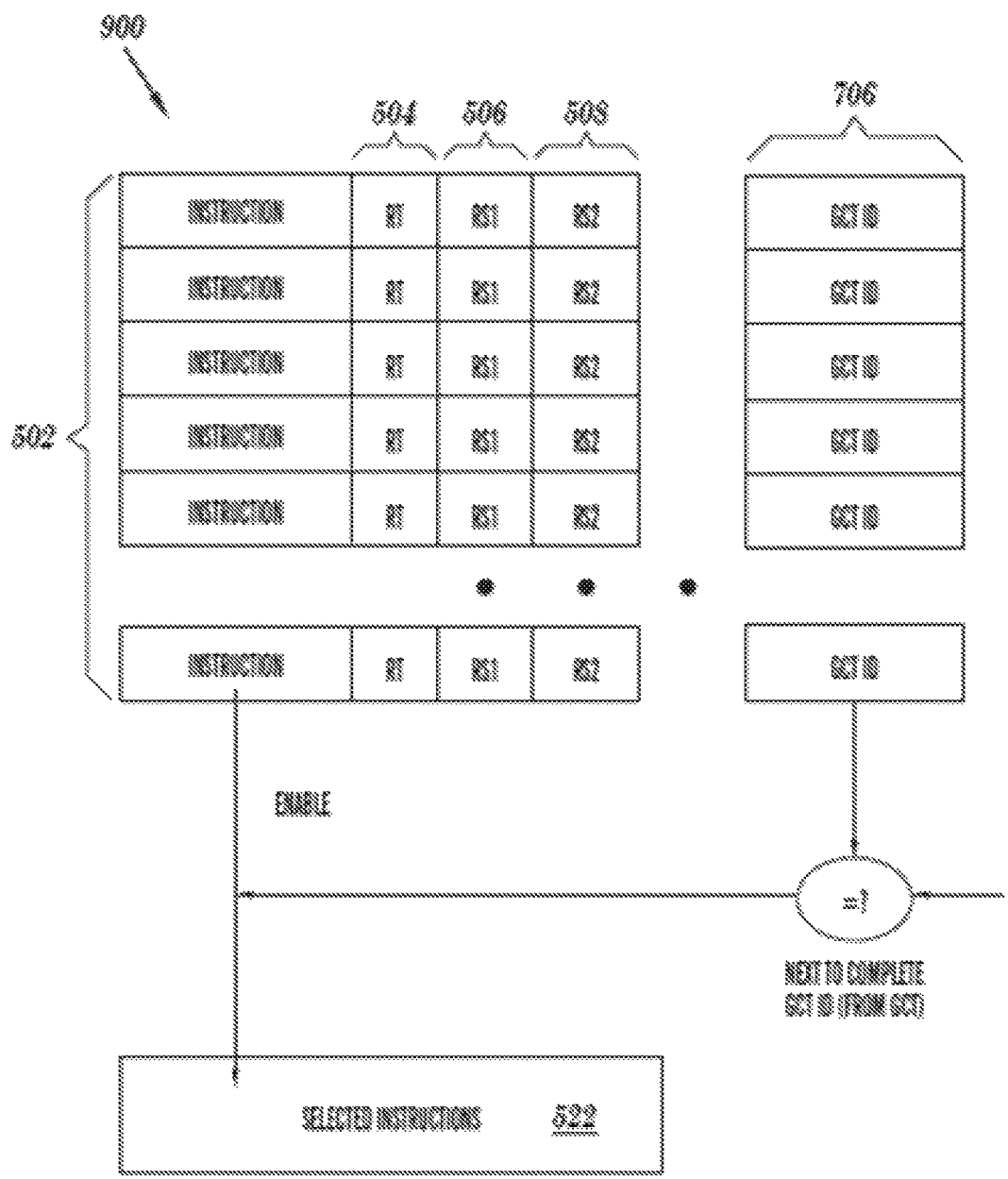
FIG. 12 depicts a modified load and store unit (LSU) issue queue, speculating across memory instructions, in accordance with the present embodiment.

Referring now to FIG. 12, a modified load and store unit (LSU) issue queue 900 optimized for allowing other instructions to speculate across memory instructions, in accordance with the present embodiment is depicted. According to such an alternate embodiment, a processor may be built that forces all memory instructions to be executed in order. As such, the tracking of the dependency in accordance with columns 510-516 (FIG. 8) can be omitted because the next to complete (oldest) instruction in the global completion table is necessarily ready to issue, because there are no instructions prior to such an instruction for whose results the next to complete instruction might wait. Since there are no prior instructions, this instruction cannot be waiting on any prior instruction. However, such an embodiment that always chooses the oldest memory load and store instruction may not be adapted to ever perform out of order memory instructions. Therefore, if the ability of allowing out of order instructions outside the transaction is desirable, e.g., when speculation throttling is not enabled, or when a memory instruction is outside of a transaction, then this embodiment does not provide the desired function. However, this embodiment may be more cost effective as compared to other possible implementations and, therefore, may be more desirable to implement if the ability of allowing out of order instructions outside the transactions is not a requirement.

In the previously explained embodiments, execution of memory load and store instructions in a transaction have been limited to executing only when the instructions are NTC (i.e., no other instruction before the memory load and store instruction inside the transaction) while throttling speculation is active. However, limiting the execution of instructions to only when the instruction is NTC may impose a significant degradation on performance since speculation is generally thought to be an advantage to execution.

As such, one embodiment may reduce the performance penalty by not preventing all speculation, but by preventing the types of speculation that are most prone to leading to excessive speculation and as such, end up adding memory addresses to a transaction's read and write sets unnecessarily. For example, branch misprediction is one of the most frequent misspeculations that excessively adds unnecessary memory locations to the transactions' read and write sets.

Therefore, according to one embodiment with speculation throttling active, memory load and stores may be held and not executed until the branch prediction has been verified as correct for all branches preceding a memory load or store instruction that (i.e., all the prior branches have successfully executed without a branch misprediction). A branch, or a branch prediction is verified (or validated, or resolved) when a branch execution executes, finds no misprediction, and completes. This is different than the previously described method of preventing memory load and store instructions from executing until the instructions are the NTC (i.e., they are the oldest instruction, or within a few instructions of NTC) and there are no other instructions waiting to execute before that instruction executes in that memory instructions can be executed significantly out of order as long as branch predictions corresponding to any branches preceding such memory instructions have been verified.

According to one implementation, memory instruction load and stores may be allowed to execute as soon as any branches preceding that memory load or store instruction have been verified as having correctly been predicted. This may prevent the negative impact of misspeculation when a branch misprediction occurs while still providing some flexibility to start memory loads and stores out of order relative to some other instructions.

In accordance with embodiment, each memory load or store instruction inside a transaction when throttling speculation is enabled is associated with a preceding branch tag (BTAG) 902 (FIG. 10). In this embodiment, each branch, according to at least one embodiment, may be identified by a tag or pointer that uniquely identifies the branch. The identifier may be used to store, for each memory load or store operation, the associated branch that comes before that memory operation. In one embodiment, issue logic is extended such that a memory load or store (that has been marked to be within a transaction when speculation throttling has been enabled) is only executed when the branch that comes before that memory load or store has been validated (i.e., that branch prediction has been verified). Each instruction's BTAG field 902 (FIG. 10) is further associated with a ready field 906 (FIG. 10) responsive to BTAG tag match 904 (FIG. 10) logic which is a further input to instruction selection logic 522. In accordance with this embodiment, the memory instructions BTAG field 902 (FIG. 10) is operatively coupled with tag match logic 904 (FIG. 10) that matches a memory instructions' BTAG field (corresponding to its immediately preceding branch instruction's BTAG) to the BTAG IDs of completed branches. In one preferred embodiment, a memory instruction 502 (FIG. 10) is marked as ready 906 (FIG. 10) only when the branch instruction identified by the BTAG 902 (FIG. 10) and all preceding branches have completed.

In accordance with an aspect of the present embodiment, executing memory load or store instructions only after preceding branch instructions have completed is beneficial because, as previously described, when a misprediction occurs, the system may flush (i.e., eliminate) the misspeculated load or store instruction. However, according to current methods, flushing the misspeculated load or store instruction from the processor does not update the transaction's memory read and write set. As such the associated entries in the transaction's memory read and write set are not removed. Therefore a correction of a misspeculation inside a processor does not correct the memory read or write sets maintained for a transaction. Conversely, when it is determined that there is no misspeculation possible on all branches preceding a memory load or store instruction since they have been correctly predicted, then it may be safe to start executing a memory load or store instruction even if there are other instructions before it. There may be other events that may conceptually lead to a misspeculation, such as a floating point exception or an external exception; however, such a misspeculation would abort the entire transaction. Therefore, such an exception has no effect on the memory load or store instructions and the transaction's read or write sets, but rather typically leads to the complete termination of the transaction because restarting execution inside a transaction would not be feasible.

As described above, each memory load or store instruction is associated with the branch that precedes that load or store instruction. As such, when it is determined that the identified and preferably all its preceding branch instructions have been verified (i.e., the branch instruction has been successfully executed), then the current memory load or store instruction may be executed.

According to one embodiment, a queue of pending branch executions (i.e., the branch information queue (BIQ) 142*a* (FIG. 4). The BIQ 142*a* (FIG. 4) may track the branches in the processor that assigns and keeps a tag or reference number for each of the branches in flight and as branches complete, the oldest branch at the head of the BIQ is removed from the queue once it has completed. Branches may complete out of order, however, they are taken from the queue in-order and the oldest branch is removed from the queue first. When a branch completes and is taken out of the BIQ 142*a* (FIG. 4), the tag is the number of the branch that is the oldest, in-order branch that just completed. Additionally, all the branches prior to that branch completed as well since that branch is the oldest branch to complete. As such, the oldest tag number completing in the BIQ 142*a* (FIG. 4) may be broadcast by BTAG broadcast logic 908 (FIG. 10) to mark as ready all memory load and store instruction associated with the currently retiring BTAG (provided other dependences, such as the operand dependences 512 (FIG. 5) and 516 (FIG. 5) are met as well). Additionally, when the oldest entry out of the BIQ 142*a* (FIG. 4) is broadcast, then all the branches prior to that branch have also been validated. Thus, when broadcasting the retiring BIQ entry's BTAG, a broadcast BTAG implies not only that the branch identified by the broadcast BTAG has completed, but rather that all the branches up to that point have been validated for correctness of prediction.

Figure 13:
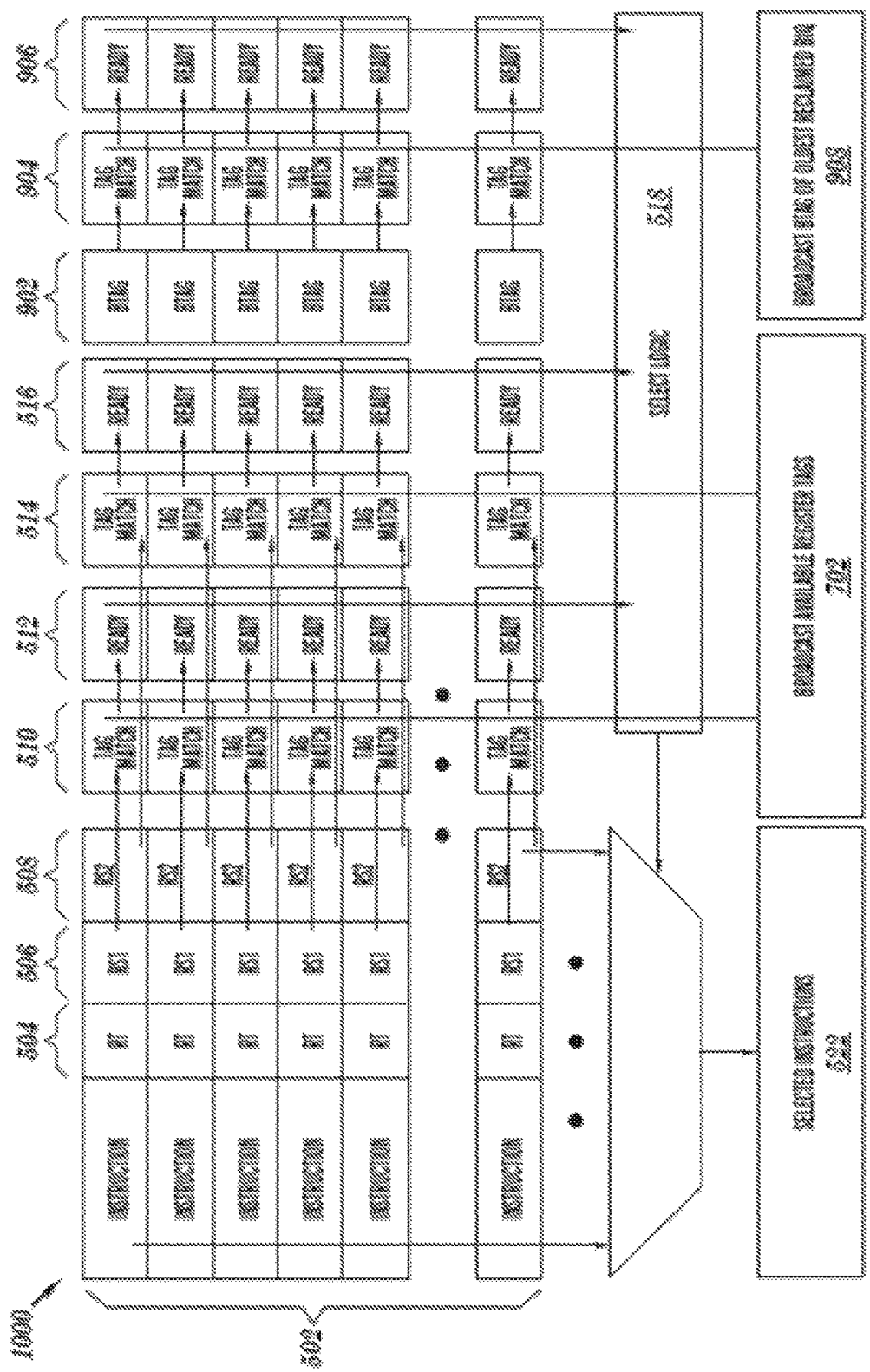
FIG. 13 depicts a modified load and store unit (LSU) issue queue speculating across memory instructions, in accordance with the present embodiment.

Referring now to FIG. 13, a modified load and store unit (LSU) issue queue1000 speculating across memory instructions, in accordance with the present embodiment is depicted. As previously described, there may be instructions 502; registers 506, 508 used by those instructions; tag match logic 510, 514 that ensures that each of the input registers to an instruction has been computed before that instruction can be selected. Additionally, all available register tags may be broadcast 702. Associated with each of these memory instructions 502 is a branch tag (BTAG) 902. The branch corresponding to BTAG 902 should be completed before the current instruction 502 may be allowed to execute. As such, there is a BTAG field 902 and a tag match logic 904 that compares the BTAG field 902 against the broadcast BTAG 908. In one embodiment, the broadcast BTAG corresponds to the BTAG ID of the oldest reclaimed BIQ entry 908. Therefore, when a branch instruction corresponding to BTAG 908 completes, all the memory instructions that immediately follow that branch instruction become eligible to execute (i.e., ready 906) since the source of misspeculation has been cleared (i.e., prevented) and misspeculation may no longer be a concern.

Another alternate embodiment may be implemented with the use of matrix schedulers since issue queues based on wake-up and select logic are complex and may be expensive to implement. Current methods of implementing matrix schedulers have been incorporated by reference herein: Masahiro Goshima et al., A High-Speed Dynamic Instruction Scheduling Scheme for Superscalar Processors, Proceedings of the 34th International Symposium on Microarchitecture MICRO 2001; Mary D. Brown et al., Select-Free Instruction Scheduling Logic, Proceedings of the 34th International Symposium on Microarchitecture MICRO 2001, and Samantika Subramaniam and Gabriel H. Loh, Store Vectors for Scalable Memory Dependence Prediction and Scheduling, Conference on High-Performance Computer Architecture HPCA 12.

Figure 14:
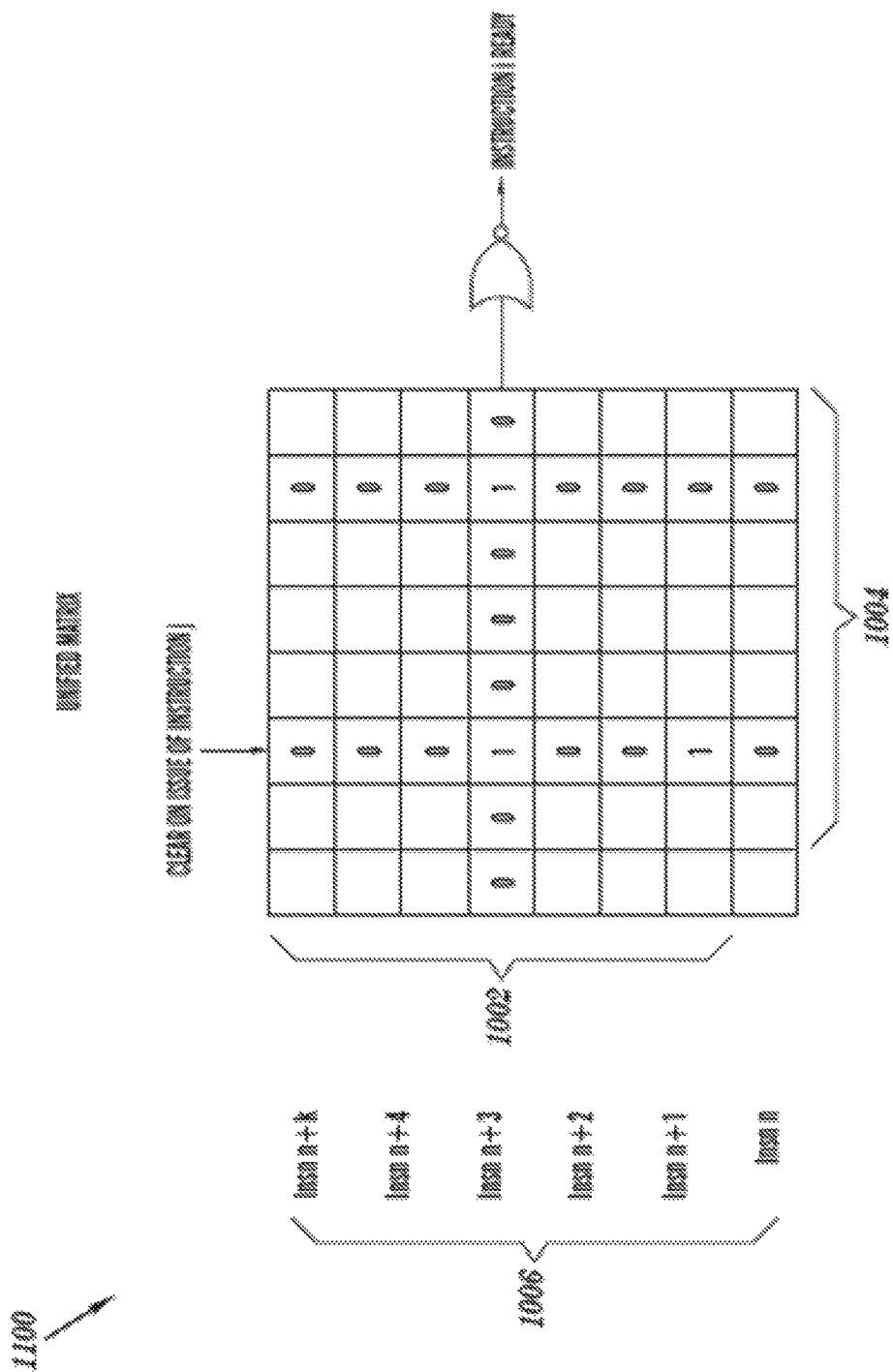
FIG. 14 depicts a matrix scheduler in accordance with current methods.

Referring now to FIG. 14, a matrix scheduler 1100 is depicted. In an embodiment, a matrix scheduler represents and tracks dependencies as a matrix of instructions. As such, all the rows 1004 are instructions in the issue queue and the columns 1002 are pending instructions. For each instruction 1006, the matrix depicts which instructions are in flight (i.e., the instructions in the rows 1004) and which instructions that instruction may depend upon (i.e., the instructions in the columns 1002). For example, when instruction "n+4" depends on instruction J, a "1" may be depicted and when "n+4" depends on another instruction (i.e., J+4), then another "1" may be depicted. Therefore, a single bit may be at the intersection of the instructions that are waiting to be issued 1004 and the instructions that are in the processor 1002 to determine if there is a dependency. In accordance with one embodiment of a matrix scheduler, when an instruction J issues, it clears dependence bits of all instructions depending on that instruction. When all dependence bits in a row associated with an instruction have cleared, that instruction, e.g., "n+3" becomes eligible to issue. As such, this implementation may be faster and easier to implement than the wake-up based tag-matching issue queue embodiment previously described.

Figure 15:
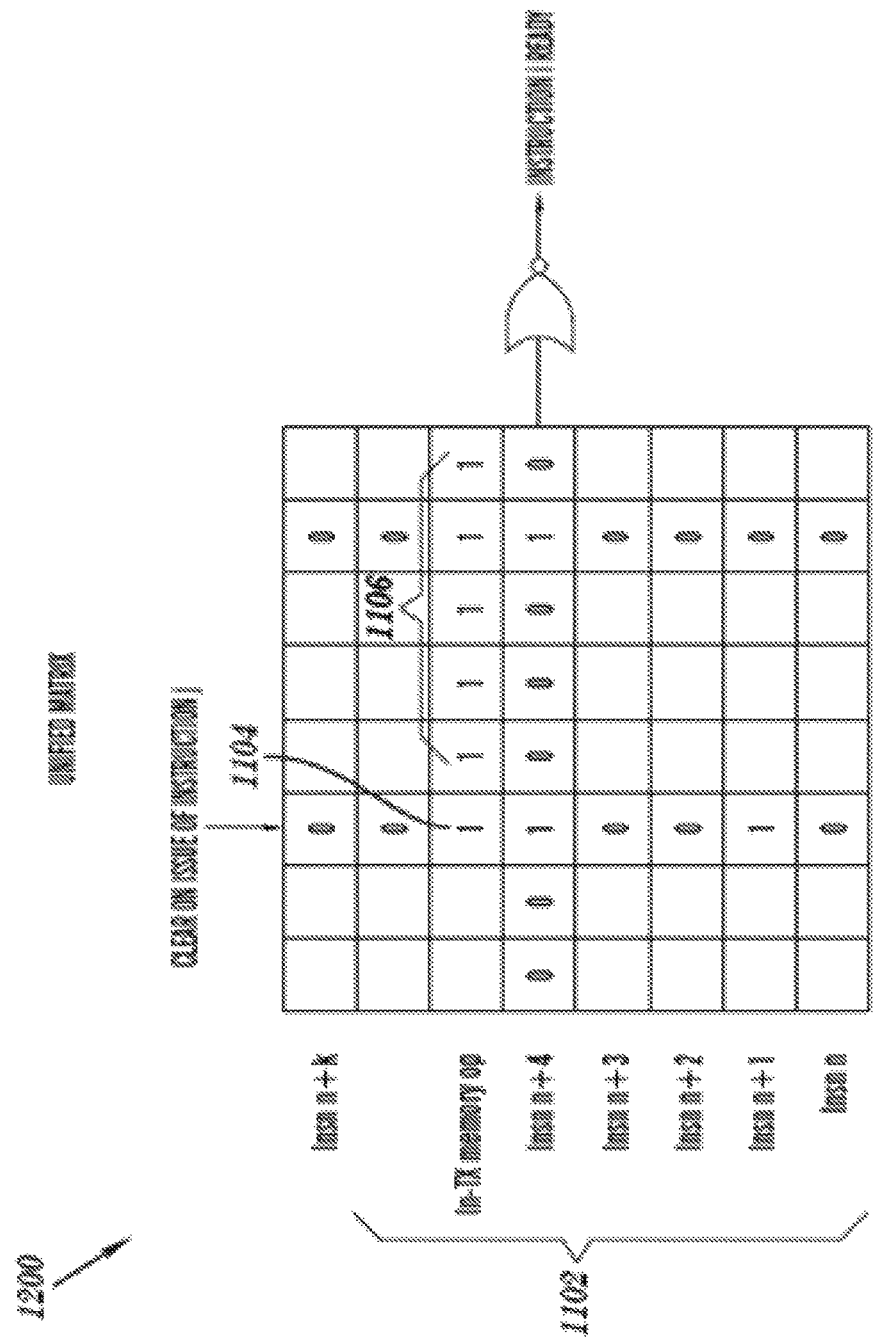
FIG. 15 depicts a matrix scheduler executing instructions only after all prior instructions have executed, in accordance with the present embodiment.

Now referring to FIG. 15, there is depicted a matrix scheduler1200 executing instructions only after all prior instructions have executed, in accordance with the present embodiment. In accordance with such an embodiment, dependence information in a matrix scheduler is created to implement the speculation throttling policy responsive to memory instructions (preferably load and store instructions) in a transaction when speculation throttling is enabled. In accordance with logic directed at creating dependence information to implement a speculation throttling policy when memory instructions are executed only when they are next to complete, dependence information logic marks candidate memory instructions as dependent on all their preceding instructions. FIG. 12 depicts the operation of a matrix scheduler in conjunction with this policy with an in-transaction memory instruction 1102 that is subject to speculation throttling and the instruction is marked 1104 to be dependent on all preceding instructions. As such, the marked instruction 1104 may only be executed after all the other instructions have been executed that are marked with a "1" in the columns of the row corresponding to instructions 1106. Therefore the policies that have previously described may be easier to implement in accordance with a matrix scheduler such as the one depicted in FIG. 12. For example, if an in transaction memory load or store needed to be forced to execute only after all the other instructions before that instruction 1104 are executed, then a "1" may be marked in the columns 1106 of all the preceding instructions. Therefore, the instruction in the row, that has been marked 1104, may only be allowed to execute after all its previous instructions 1106 have been issued and have cleared their associated column. As such, an NTC policy that executes a memory instruction only after all the previous instructions have executed, may be implemented by marking the row 1104 as being dependent on all preceding instructions.

Figure 16:
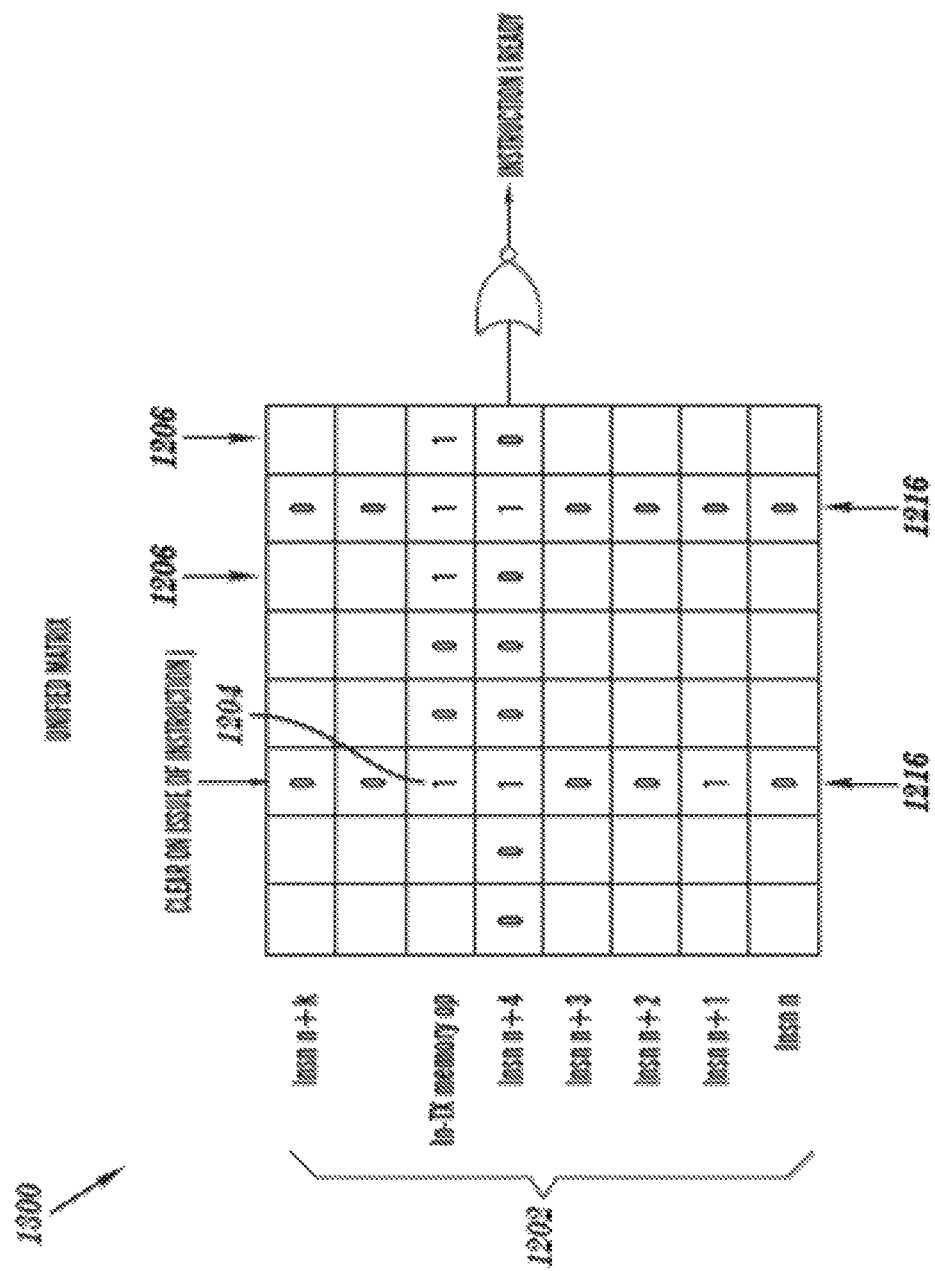
FIG. 16 depicts a matrix scheduler executing instructions only after all prior branch instructions have executed in order to verify correctness of branch predictions, in accordance with the present embodiment.

Now referring to FIG. 16, there is depicted a matrix scheduler 1300 executing instructions only after all prior branch instructions have executed, in accordance with the present embodiment. There may be an in-transaction memory instruction 1202 subject to speculation throttling and an instruction may be marked 1204 to be dependent on all real data dependencies (shown as "1" in columns 1216) and on all preceding branches (shown as "1" in columns 1206). As such, the marked instruction 1204 may only be executed after all the other instructions have been executed that are marked with a "1" and are represented in the columns of the dependence matrix of the matrix scheduler. The figure shows an exemplary in-transaction memory operation to be dependent on two branch instructions in columns 1206. Therefore the policies that have previously described may be easier to implement in accordance with a matrix scheduler such as the one depicted in FIG. 13. For example, if an in transaction memory load or store 1202 needed to be forced to execute only after all the branches prior to that instruction have been validated, then a "1" may be marked in the columns 1206 corresponding to all the preceding branches. Therefore, the instruction in the row, that has been marked 1204, may only be allowed to execute after all the branches prior 1206 to that instruction 1204 have been validated in their associated column.

In accordance with one embodiment, these policies are implemented as part of the dependence analysis logic. Other than determining which bits to set in accordance with the policies described herein, there may be no additional modification needed to implement a matrix scheduler to support the executions previously described with respect to FIGS. 15-16.

Speculation throttling, limiting the execution of memory loads or stores within a transaction, may not always need to be implemented immediately. Therefore, speculation throttling, limiting the execution of memory loads or stores within a transaction, may be controlled by an adaptive speculation throttling mode which may correspond to misspeculations.

Figure 17:
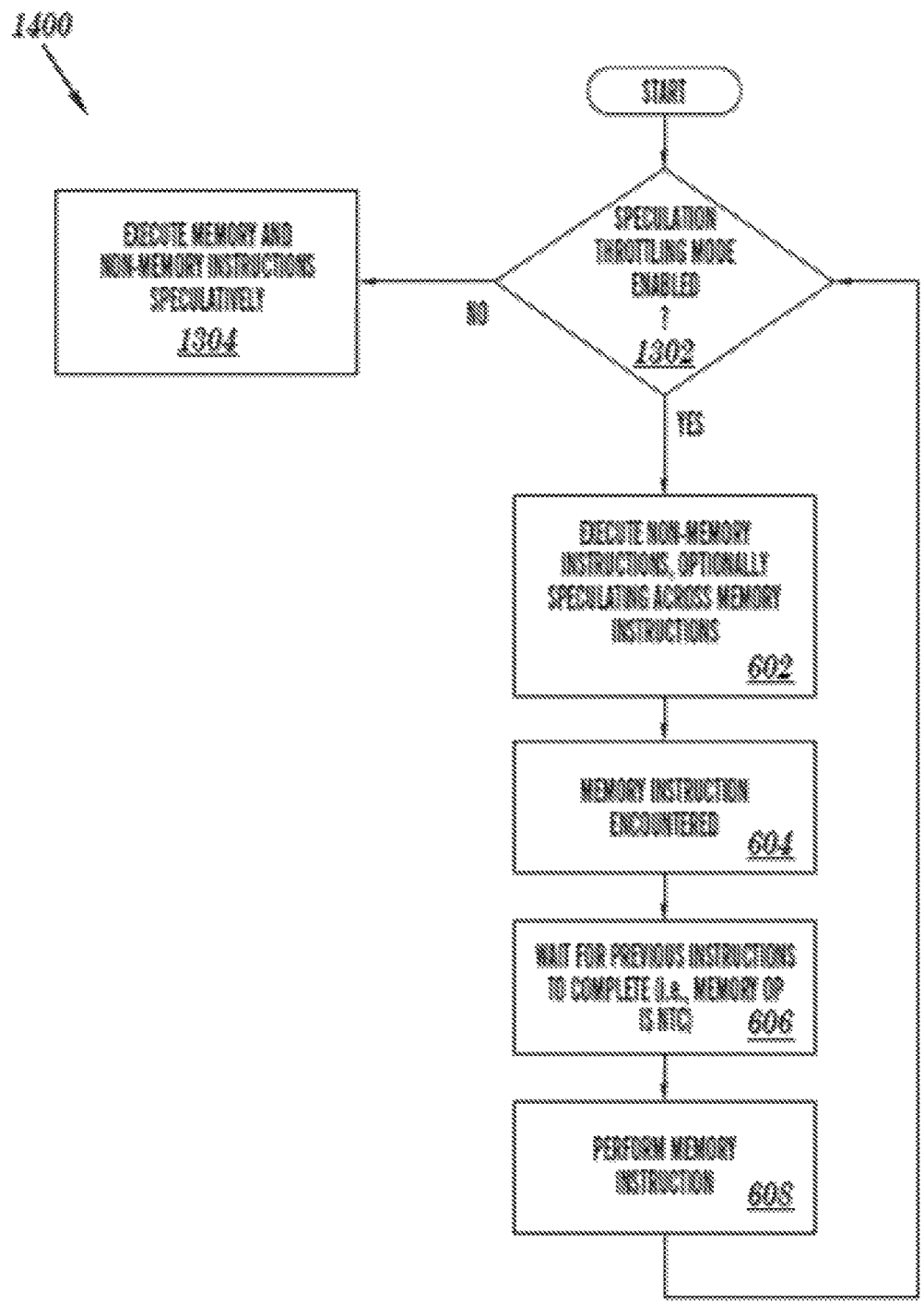
FIG. 17 depicts an adaptivity flowchart illustrating the operations carried out by a processor to determine whether the speculation throttling mode is enabled in accordance with the present embodiment.

Referring now to FIG. 17, an adaptivity flowchart 1400 illustrating the operations carried out by a processor to determine whether the speculation throttling mode is enabled in accordance with the present embodiment is depicted. The speculation throttling mode, which was explained in detail with respect to FIG. 7 above, may be enabled by a program with statically inserted instructions to enable and disable the speculation throttling mode. For example, by a compiler or programmer, based on heuristics, program analysis, program instrumentation, or previously observed program behavior. In other embodiments, speculation throttling mode may also be enabled autonomously by hardware, or a combination of hardware and software.

At 1302, it may be determined whether the speculation throttling mode was enabled. If it is determined at 1302 that the mode is enabled, then in accordance with the flowchart described with respect to FIG. 7, all non-memory instructions may be executed, optionally speculating across memory instructions at 602. When a memory instructed is encountered at 604, all previous instructions may be completed at 606 and then at 608, the memory instruction may be performed. If it is determined at 1302, that the speculation throttling mode is not enabled, then at 1304, all memory and non-memory instructions may be executed speculatively.

Figure 18:
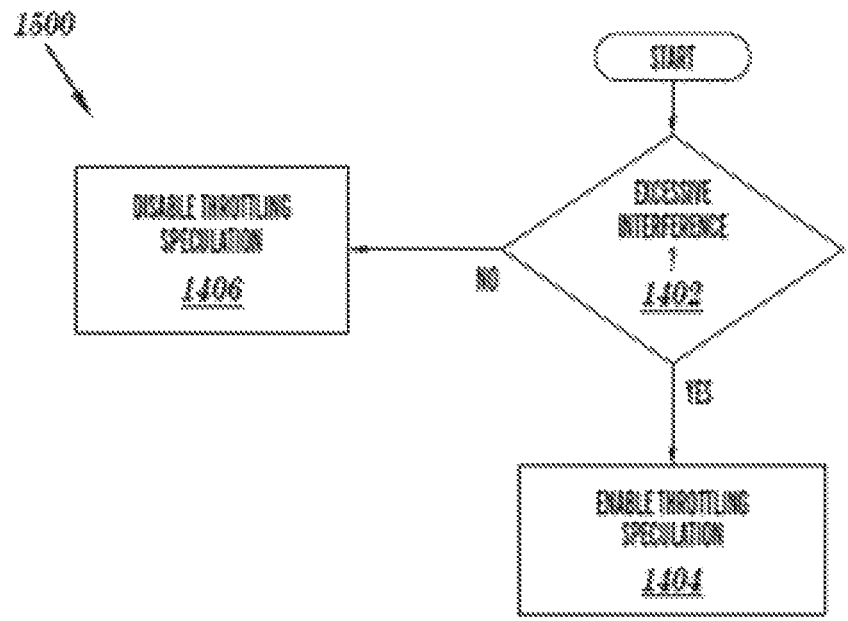
FIG. 18 depicts a flowchart illustrating the operations to enable throttling speculation based on dynamic behavior in accordance with the present embodiment.

Referring now to FIG. 18, a flowchart 1500 illustrating the operations to enable speculation throttling mode based on dynamic behavior in accordance with the present embodiment is depicted. The speculation throttling mode may be enabled by a program dynamically based on dynamic failure counts (i.e., misspeculations), or enabled by a library, middleware, an operating system, a hypervisor, a firmware, a dynamic optimization component, a millicode, or other responsive to dynamic failure patterns or counts in a system. Additionally, the speculation throttling mode may be enabled by hardware responsive to failure patterns or counts without requiring the need of programmer intervention (i.e., the processor may enable the speculation throttling mode).

At 1402, it is determined whether excessive interference has been encountered. For example, whether excessive misspeculations have occurred. If it is determined at 1402 that excessive interference has been encountered, then at 1404, throttling speculation may be enabled. Conversely, if at 1402 it is determined that excessive interference has not been encountered, then at 1406, throttling speculation may be disabled.

Figure 19:
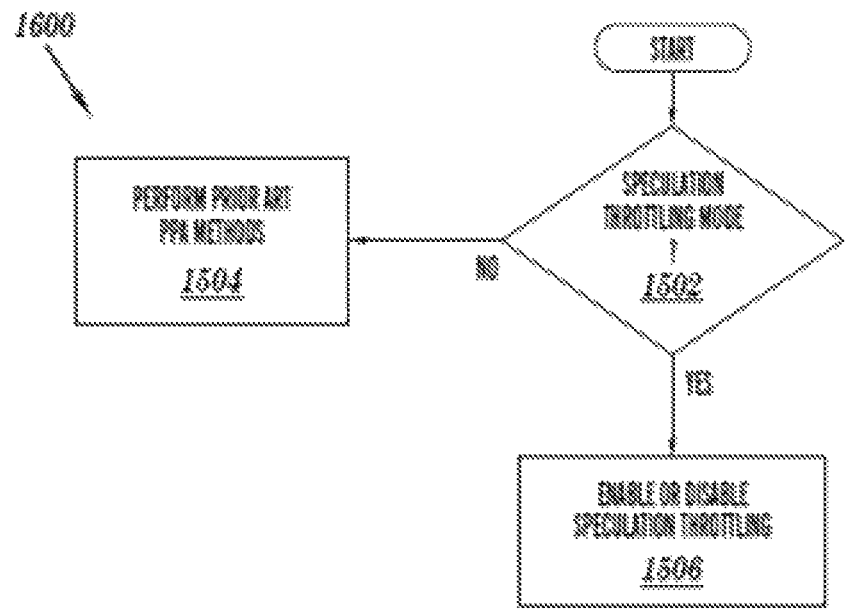
FIG. 19 depicts a flowchart illustrating the operations for a perform processor assist (PPA) instruction in accordance with the present embodiment.

Referring now to FIG. 19, a flowchart 1600 illustrating the operations for a perform processor assist (PPA) instruction in accordance with the present embodiment is depicted. At 1502, it may be determined whether the speculation throttling mode is indicated to be enabled. If, at 1502, it is determined that the speculation throttling mode is not enabled and not needed, then at 1504, current PPA methods may be implemented.

If at 1502, it is determined the speculation throttling mode is to be configured to be enabled or disabled, then at 1506, the speculation throttling mode may either be enabled (i.e., if it is not enabled already) or disabled (i.e., if it is enabled and it needs to be disabled).

Figure 20:
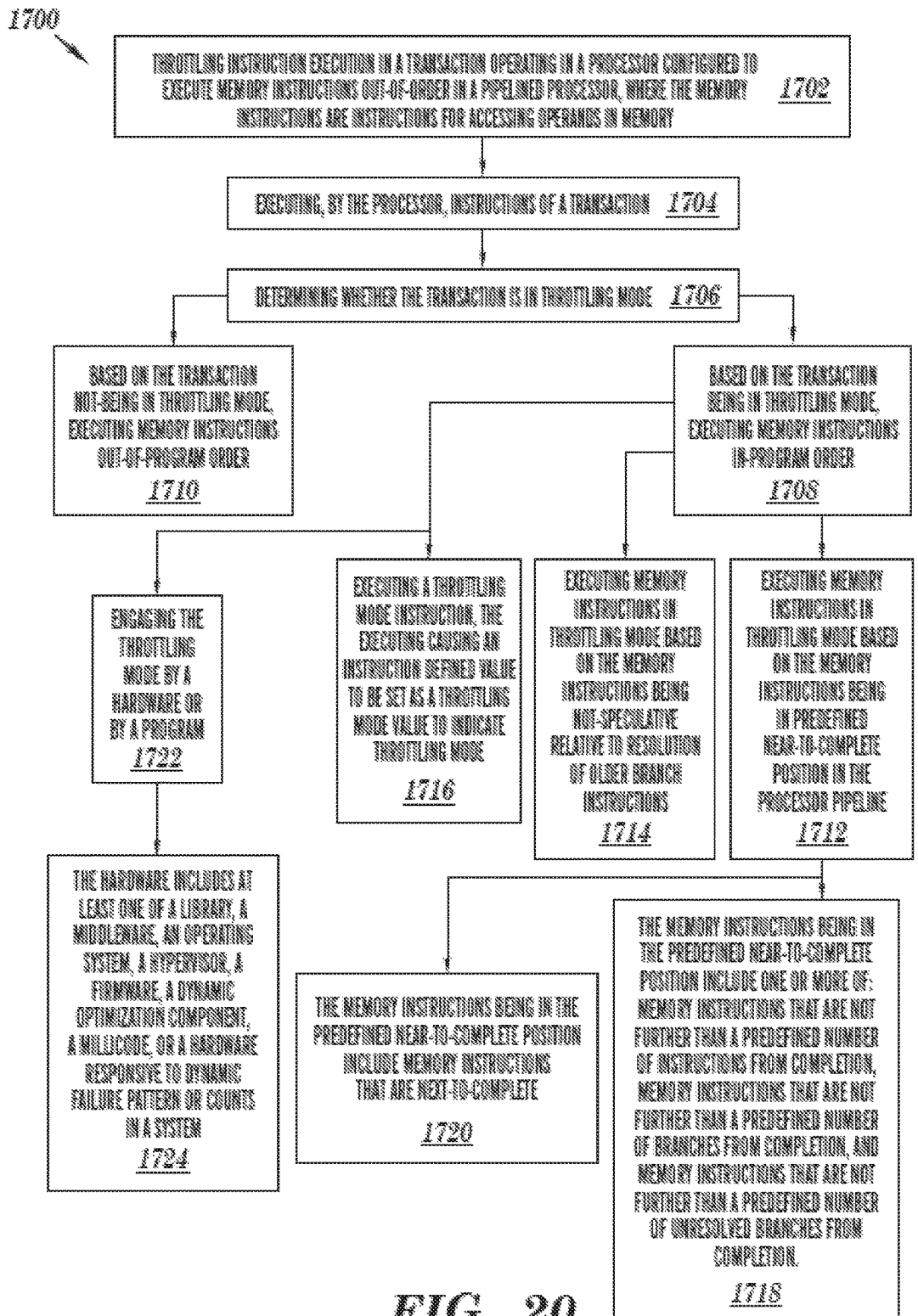
FIG. 20 depicts an exemplary flowchart where throttling instruction execution in a transaction operating in a processor configured to execute memory instructions out-of-order in a pipelined processor, wherein memory instructions are instructions for accessing operands in memory in accordance with the present embodiment.

Referring now to FIG. 20, an exemplary flowchart 1700 where throttling instruction execution in a transaction operating in a processor configured to execute memory instructions out-of-order in a pipelined processor, wherein memory instructions are instructions for accessing operands in memory 1702 is depicted. Included is executing, by the processor, instructions of a transaction 1704 including determining whether the transaction is in throttling mode 1706 and based on the transaction being in throttling mode, executing memory instructions in-program-order 1708. Based on the transaction not-being in throttling mode, executing memory instructions out-of-program order 1710. Also included is executing memory instructions in throttling mode based on the memory instructions being in predefined near-to-complete position in the processor pipeline 1712 and executing memory instructions in throttling mode based on the memory instructions being not-speculative relative to resolution of older branch instructions 1714. Also included is executing a throttling mode setting instruction, the executing causing an instruction defined value to be set as a throttling mode value to indicate throttling mode 1716. The memory instructions being in the predefined near-to-complete position consist of at least one of memory instructions that are not further than a predefined number of instructions from completion, memory instructions that are not further than a predefined number of branches from completion, and memory instructions that are not further than a predefined number of unresolved branches from completion 1718. The memory instructions being in the predefined near-to-complete position consist of memory instructions that are next-to-complete 1720. The throttling mode is engaged by a hardware or by a program 1722. The hardware includes at least one of a library, a middleware, an operating system, a hypervisor, a firmware, a dynamic optimization component, a millicode, or a hardware responsive to dynamic failure pattern or counts in a system 1724.

FIG. 21 is a block diagram 1800 of internal and external components of the hardware and the software of the computer environment according to the present embodiment. It should be appreciated that FIG. 21 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

A computer and network server may include respective sets of internal components 800 and external components 900. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs are stored on one or more of the respective computer-readable tangible storage devices 830 for execution by one or more of the respective processors 820 via one or more of the respective RAMs 822 (which typically include cache memory). In the embodiment illustrated in FIGS. 3-6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless wi-fi interface cards, or 3G or 4G wireless interface cards or other wired or wireless communication links A software program in a client computer can be downloaded to a client computer from an external computer via a network (for example, the Internet, a local area network or other, wide area network) and respective network adapters or interfaces 836. From the network adapters or interfaces 836, the software program in client computer is loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present embodiment have been described with respect to block diagrams and/or flowchart illustrations of methods, apparatus (system), and computer program products according to the present embodiment. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present embodiment has been presented for purposes of illustration and description. It is not intended to be exhaustive or to limit the embodiment to the precise form disclosed. Many modifications and variations are possible. Such modifications and variations that may be apparent to a person skilled in the art of the embodiment are intended to be included within the scope of the embodiment as defined by the accompanying claims.

Various embodiments of the embodiment may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although one or more examples have been provided herein, these are only examples. Many variations are possible without departing from the spirit of the present embodiment. For instance, processing environments other than the examples provided herein may include and/or benefit from one or more aspects of the present embodiment. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The flow diagrams depicted herein are just examples. There may be many variations to these diagrams or the steps (or operations) described therein without departing from the spirit of the embodiment. For instance, the steps may be performed in a differing order, or steps may be added, deleted, or modified. All of these variations are considered a part of the claimed embodiments.

Although preferred embodiments have been depicted and described in detail herein, it will be apparent to those skilled in the relevant art that various modifications, additions, substitutions and the like can be made without departing from the spirit of the embodiment, and these are, therefore, considered to be within the scope of the embodiment, as defined in the following claims.

What is claimed is:

1. A computer system for throttling instruction execution in a transaction operating in a processor configured to execute memory instructions out-of-order in a pipelined processor, wherein memory instructions are instructions for accessing operands in memory, the computer system comprising:
a memory;
a processor in communications with the memory, wherein the computer system is configured to perform a method, said method comprising:
executing, by the processor, instructions of a transaction comprising:
executing non-memory instructions without engaging speculation throttling, wherein speculation throttling reduces the number of speculative transactional executions;
identifying a first set of memory instructions within the transaction, wherein the memory instructions must be executed in a particular order;
based on identifying a first set of memory instructions within the transaction, engaging speculation throttling;
identifying a second set of memory instructions within the transaction, wherein the memory instructions must be executed out-of-program order; and
based on identifying a second set of memory instructions within the transaction, executing the second set of memory instructions without engaging speculation throttling.

2. The computer system according to claim 1, further comprising:
determining whether a position of the memory instructions within the processor pipeline is within a threshold distance of being executed; and
executing memory instructions engaging speculation throttling based on the memory instructions being not-speculative relative to resolution of older branch instructions.

3. The computer system according to claim 2, wherein the determined memory instructions within the processor pipeline is within a threshold distance of being executed consist of at least one of memory instructions that are not further than a predefined number of instructions from completion, memory instructions that are not further than a predefined number of branches from completion, and memory instructions that are not further than a predefined number of unresolved branches from completion.

4. The computer system according to claim 2, wherein the determined memory instructions within the processor pipeline is within a threshold distance of being executed consist of memory instructions that are next in a queue to be completed.

5. The computer system according to claim 1, further comprising: executing a throttling mode setting instruction, the executing causing an instruction defined value to be set as a throttling mode value to indicate throttling mode.

6. The computer system according to claim 1 where in the throttling mode is engaged by a hardware or by a program.

7. The computer system according to claim 6, wherein the hardware or program comprises at least one of a library, a middleware, an operating system, a hypervisor, a firmware, a dynamic optimization component, a millicode, or a hardware responsive to dynamic failure pattern or counts in a system.

8. A computer program product for throttling instruction execution in a transaction operating in a processor configured to execute memory instructions out-of-order in a pipelined processor, wherein memory instructions are instructions for accessing operands in memory, the computer program product comprising
a computer readable storage non-transitory medium readable by a processing circuit and storing instruction instructions for execution by the processing circuit for performing a method comprising:
executing, by the processor, instructions of a transaction comprising:
executing non-memory instructions without engaging speculation throttling, wherein speculation throttling reduces the number of speculative transactional executions;
identifying a first set of memory instructions within the transaction, wherein the memory instructions must be executed in a particular order;
based on identifying a first set of memory instructions within the transaction, engaging speculation throttling;
identifying a second set of memory instructions within the transaction, wherein the memory instructions must be executed out-of-program order; and
based on identifying a second set of memory instructions within the transaction, executing the second set of memory instructions without engaging speculation throttling.

9. The computer program product according to claim 8, further comprising:
determining whether a position of the memory instructions within the processor pipeline is within a threshold distance of being executed; and
executing memory instructions engaging speculation throttling based on the memory instructions being not-speculative relative to resolution of older branch instructions.

10. The computer program product according to claim 9, wherein the determined memory instructions within the processor pipeline is within a threshold distance of being executed consist of at least one of memory instructions that are not further than a predefined number of instructions from completion, memory instructions that are not further than a predefined number of branches from completion, and memory instructions that are not further than a predefined number of unresolved branches from completion.

11. The computer program product according to claim 9, wherein the determined memory instructions within the processor pipeline is within a threshold distance of being executed consist of memory instructions that are next in a queue to be completed.

12. The computer program product according to claim 8, further comprising: executing a throttling mode setting instruction, the executing causing an instruction defined value to be set as a throttling mode value to indicate throttling mode.

13. The computer program product according to claim 8, where in the throttling mode is engaged by a hardware or by a program.

14. The computer program product according to claim 13, wherein the hardware or program comprises at least one of a library, a middleware, an operating system, a hypervisor, a firmware, a dynamic optimization component, a millicode, or a hardware responsive to dynamic failure pattern or counts in a system.

* * * * *